US012595339B2

(12) United States Patent
Fisk et al.

(10) Patent No.: US 12,595,339 B2
(45) Date of Patent: Apr. 7, 2026

(54) PREPARATION OF ORGANOSILICON COMPOUNDS WITH ALDEHYDE FUNCTIONALITY

(71) Applicants: Dow Silicones Corporation, Midland, MI (US); Dow Global Technologies LLC, Midland, MI (US)

(72) Inventors: Jason Fisk, Midland, MI (US); Robert Larsen, Midland, MI (US); Haoquan Li, Midland, MI (US); Michael Tulchinsky, Midland, MI (US); Gary Wieber, Wayland, MI (US); David Devore, Midland, MI (US); John Gohndrone, Surprise, AZ (US); Michael Ferritto, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 419 days.

(21) Appl. No.: 18/004,530

(22) PCT Filed: Oct. 11, 2021

(86) PCT No.: PCT/US2021/054345
§ 371 (c)(1),
(2) Date: Jan. 6, 2023

(87) PCT Pub. No.: WO2022/081444
PCT Pub. Date: Apr. 21, 2022

(65) Prior Publication Data

US 2023/0242711 A1 Aug. 3, 2023

Related U.S. Application Data

(60) Provisional application No. 63/090,740, filed on Oct. 13, 2020.

(51) Int. Cl.
*C08G 77/08* (2006.01)
*B01J 31/18* (2006.01)

(52) U.S. Cl.
CPC ............ *C08G 77/08* (2013.01); *B01J 31/185* (2013.01)

(58) Field of Classification Search
CPC ............................... C07C 45/50; B01J 31/185
USPC ..................................................... 568/50, 454
See application file for complete search history.

(56) References Cited

U.S. PATENT DOCUMENTS 2,462,635 A 2/1949 Haber
2,588,083 A * 3/1952 Hurd ........................ C07F 7/081 525/503
2,676,182 A 4/1954 Paudt et al.
3,243,404 A 3/1966 Martellock
3,284,406 A 11/1966 Nelson
3,842,112 A 10/1974 Omietanski et al.
3,879,433 A 4/1975 Omietanski et al.
3,933,695 A 1/1976 Omietanski et al.
4,374,967 A 2/1983 Brown et al.
4,424,392 A 1/1984 Petty
4,584,355 A 4/1986 Blizzard et al.
4,585,836 A 4/1986 Homan et al.
4,591,622 A 5/1986 Blizzard et al.
4,611,042 A 9/1986 Rivers-Farrell et al.
4,737,588 A 4/1988 Billig et al.
4,769,498 A * 9/1988 Billig ...................... C07C 45/50 502/158
4,772,515 A 9/1988 Hara et al.
4,774,310 A 9/1988 Butler
4,898,961 A 2/1990 Baile et al.
5,010,159 A 4/1991 Bank et al.
5,021,601 A * 6/1991 Frances .................. C08G 77/14 556/436
5,169,920 A 12/1992 Okawa
5,317,072 A 5/1994 Bokerman et al.
5,387,706 A 2/1995 Rasmussen et al.
5,681,473 A 10/1997 Miller et al.
5,727,893 A 3/1998 Handler
5,739,246 A 4/1998 Graiver et al.
5,756,796 A 5/1998 Davern et al.
5,902,892 A 5/1999 Larson et al.
5,910,600 A 6/1999 Urata et al.
6,001,943 A 12/1999 Enami et al.
6,281,285 B1 8/2001 Becker et al.
6,297,331 B1 10/2001 Feldmann-Krane et al.
6,680,414 B2 1/2004 Knoop et al.
6,806,339 B2 10/2004 Cray et al.
6,956,087 B2 10/2005 Lai et al.
7,446,231 B2 11/2008 Peterson et al.
7,524,997 B2 4/2009 Kaizik et al.
(Continued)

FOREIGN PATENT DOCUMENTS

CN 106431869 2/2017
DE 102004042815 3/2006
(Continued)

OTHER PUBLICATIONS

Airiau, "Short Access to (+)-Lupinine and (+)- Epiquinamide via Double Hydroformylation", Organic Letters, 2010, vol. 12, No. 3, pp. 528-531.
Arkles, "Reactive Silicones: Forging New Polymer Links", Gelest, 2016, Ver. 6.
Cai, "New Tetraphosphorus Ligands for highly Linear Selective Hydroformylation of Allyl and Vinyl Derivatives", 2012, vol. 18, pp. 9992-9998.
Cuny, "Practical, High-Yield, Regioselective, Rhodium-Catalyzed Hydroformulation of Functionalized Alpha-Olefines", Jounral of the American Chemical Society, vol. 115, No. 5, 1993, pp. 2066-2068.
(Continued)

*Primary Examiner* — Margaret G Moore
(74) *Attorney, Agent, or Firm* — Catherine U. Brown

(57) ABSTRACT

A catalyzed hydroformylation process of an alkenyl-functional organosilicon compound with carbon monoxide and hydrogen produces an aldehyde-functional organosilicon compound.

18 Claims, No Drawings

(56) References Cited

U.S. PATENT DOCUMENTS

| | | | |
|---|---|---|---|
| 7,531,698 | B2 | 5/2009 | Zhang et al. |
| 7,696,294 | B2 | 4/2010 | Asirvatham |
| 7,999,053 | B2 | 8/2011 | Sutton et al. |
| 8,546,508 | B2 | 10/2013 | Nabeta et al. |
| 8,580,073 | B2 | 11/2013 | Behl et al. |
| 8,748,643 | B2 | 6/2014 | Priske et al. |
| 9,127,030 | B2 | 9/2015 | Kreidler et al. |
| 9,217,003 | B2 | 12/2015 | Dyballa et al. |
| 9,499,671 | B2 | 11/2016 | Narayan et al. |
| 9,567,276 | B2 | 2/2017 | Klasovsky et al. |
| 9,795,952 | B2 | 10/2017 | Diebolt et al. |
| 9,926,338 | B2 | 3/2018 | Calimente et al. |
| 10,023,516 | B2 | 7/2018 | Brammer et al. |
| 10,155,200 | B2 | 12/2018 | Geilen et al. |
| 10,155,852 | B2 | 12/2018 | Enami |
| 10,214,550 | B2 | 2/2019 | Dyballa et al. |
| 10,227,365 | B2 | 3/2019 | Miller et al. |
| 10,526,356 | B2 | 1/2020 | Dyballa et al. |
| 2007/0289495 | A1 | 12/2007 | Cray et al. |
| 2016/0376482 | A1 | 12/2016 | Morgeneyer et al. |
| 2020/0014061 | A1 | 1/2020 | Wang et al. |

FOREIGN PATENT DOCUMENTS

| | | |
|---|---|---|
| EP | 392948 | 10/1990 |
| EP | 0402274 | 12/1990 |
| FR | 2717480 | 9/1995 |
| JP | 11246464 | 9/1999 |
| JP | 11255696 | 9/1999 |
| JP | 2016155065 | 9/2016 |
| WO | 83/02948 | 9/1983 |
| WO | 2006027074 | 3/2006 |
| WO | 2015089811 | 6/2015 |
| WO | 2018204068 | 11/2018 |
| WO | 2019231610 | 12/2019 |
| WO | 2022049036 | 3/2022 |

OTHER PUBLICATIONS

Dorrich, "Sila-[alpha]-galbanone and Analogues: Synthesis and Olfactory Characterization of Silicon-Containing Derivatives of the Galbanum Odorant [alpha]—Galbanone", Eur. J. Inorg. Chem., 2014, pp. 4394-4407.

Gao, "Aldehydepropyl-functionalized mesostructured cellular foams: Efficient supports for immobilization of penicillin G acylase", Journal of Molecular Catalysis B: Enzymatic, 2014, vol. 105, pp. 111-117.

Grande, "Testing the Functional Tolerance of the Piers0Rubinsztajn Reaction: A New Strategy for Functional Silicones" Supplementary Material (ESI) for Chemical Communications, The Royal Society of Chemistry, 2010.

Keck, "Synthetic Studies on the Bryostatins: Preparation of a truncated BC-Ring Intermediate by Pyran Annulation", Organic Letters, vol. 7, No. 11, 2005, pp. 2149-2151.

Kunze, "Calix[4]arene-based Bis-phosphonites, Bis-phosphites, and Bis-O-Acyl-phosphites as Ligands in the Rhodium (I)-catalyzed Hydroformylation of 1-Octene", Anorg allg Chem, 2002.

Mieczynska, Hydroformylation and related reactions of vinylsilanes catalyzed by siloxide complexes of rhodium(I) and iridium(I), J. Mol. Cat. A: Chemical, vol. 237, is. 1-2, pp. 246, 2005.

Noll, Walter. "Chemistry and Technology of Silicone" Academic Press, 1968, chapter 5, p. 190-245.

Puckette, "Halophosphite Ligands for the Rhodium Catalyzed Low-Pressure Hydroformylation Reaction", Eastman Chem Co, 2007.

Semeril, "Highly Regioselective Hydroformylation with Hemispherical Chelators", Chem Eur J, 2008.

Spangenberg, "Hydroformylation of Homoallylic Azides: A Rapid Approach toward Alkaloids", Organic Letters, vol. 11, No. 2, 2009, pp. 261-264.

Steyer, "Bis-phosphites and bis-phosphinites based on distally-functionalised calix[4]arenes:coordination chemistry and use in rhodium-catalysed, low-pressure olefin hydroformylation", Dalton Trans, 2005.

Takeuchi "Hydroformylation of alkenes having organosilicon substituents", Journal of Organometallic Chemistry, 1990, vol. 393, pp. 1-10.

Tang, "Thermal Catalytic Conversion of Alkanes to Linear Aldehydes and Linear Amines", Journal of the American Chemical Society, 2018, vol. 140, No. 11, pp. 4157-4163.

Van Rooy, "Bulky diphosphate-modified rhodium catalysts: hydroformylation and characterization," Organometallics 1996, vol. 15, pp. 835-847.

Xu, "Easily Accessible and Highly Tunable Bisphosphine Ligands for Asymmetric Hydroformylation of Terminal and Internal Alkenes", Chem. Eur. J., 2014, vol. 20, pp. 4357-4362.

Zhang, "Rhodium-Catalyzed Asymmetric Hydroformylation of N-Allylamides: Highly Enantioselective Approach to [beta] 2-Amino Aldehydes", Angew. Chem. Int. Ed., 2010, vol. 49, pp. 4047-4050.

Cai, "New tetraphosphorus ligands for highly linear selective hydroformylation of allyl and vinyl derivatives", ChemPubSoc Europe, 2012, vol. 18, pp. 9992-9998.

Xiaofei, "Pyrrolyl-based phosphoramidite/Rh catalyzed asymmetric hydroformylation of 1,1-disubstituted olfeins", Chin. J. Org. Chem., 2019, vol. 39, pp. 207-214.

Search Report and Written Opinion for International Application No. PCT/US2023/018464 dated Jun. 7, 2023.

* cited by examiner

PREPARATION OF ORGANOSILICON COMPOUNDS WITH ALDEHYDE FUNCTIONALITY

CROSS REFERENCE TO RELATED APPLICATIONS

This application is a U.S. national stage filing under 35 U.S.C. § 371 of PCT Application No. PCT/US2021/054345 filed on 11 Oct. 2021, which claims the benefit of U.S. Provisional Patent Application No. 63/090,740 filed 13 Oct. 2020 under 35 U.S.C. § 119 (e). PCT Application No. PCT/US2021/054345 and U.S. Provisional Patent Application No. 63/090,740 are each hereby incorporated by reference.

TECHNICAL FIELD

A process for preparing an aldehyde-functional organosilicon compound is disclosed. More particularly, the process for preparing the aldehyde-functional organosilicon compound employs a rhodium bisphosphite ligand catalyst for hydroformylation of an alkenyl-functional organosilicon compound with carbon monoxide and hydrogen.

INTRODUCTION

Aldehydes are important intermediates in the synthesis of other functionalized materials like alcohols, carboxylic acids, and amines. The introduction of aldehyde functionality into organosilicon compounds such as silanes and siloxanes affords the opportunity to generate a wide variety of organic functionalized organosilicon compounds.

Existing methods for preparing aldehyde-functional organosilicon compounds (e.g., silanes and siloxanes) may suffer from one or more drawbacks such as requiring multiple chemical steps, drastic conditions, and/or high catalyst loadings; and such methods may also have slow reaction rates and/or produce undesirable by-products. U.S. Pat. No. 7,999,053 discloses one means for preparing aldehyde functional siloxanes, which involves the reaction of a hydride functional siloxane with an acetal containing an alpha-olefin group. After the hydrosilylation is complete, the aldehyde is then liberated using an acidic catalyst and water. This reaction is typically biphasic, generates significant amounts of waste by-products, and requires multiple steps to recover the desired product.

Ozonolysis is another route to aldehyde functional siloxanes. This route involves the exposure of an olefin functional siloxane to ozone to form silicone ozonides. The ozonides can be further reacted under acidic conditions to form aldehydes. This route also has multiple steps.

The Grignard coupling of bromophenyldioxolanes with chlorosilanes and subsequent hydrosilylation with vinyl functional siloxanes is another method for preparing aldehyde functional siloxanes. This method also has multiple steps and generates waste.

Another possible route to aldehyde functional silicones is the hydrosilylation of SiH functional siloxanes with (non-silicon) aldehyde compounds that also contain other unsaturated carbon-carbon bonds. This route may suffer from the drawback of competing reaction of the addition of the SiH across the aldehyde carbonyl group. Furthermore, hydrosilylation routes may also suffer from the drawback of forming large amounts of branched isomer, an undesirable by-product.

Hydroformylation of vinyl functional silanes and vinyl-functional siloxanes has also been proposed. However, previously proposed processes suffer from one or more of the following drawbacks: slow reaction rate, low selectivity to a desired linear isomer product, and high catalyst loading required for the reaction. Slow reaction rate leads to low productivity. The high catalyst loading needed would lead to difficulties in catalyst recycling. Low linear selectivity would lead to product decomposition because the branched product tends to undergo Brook rearrangement reaction.

SUMMARY

A process for preparing an aldehyde-functional organosilicon compound is disclosed. The process comprises: 1) combining, under conditions to catalyze hydroformylation reaction, starting materials comprising (A) a gas comprising hydrogen and carbon monoxide, (B) an alkenyl-functional organosilicon compound, and (C) a rhodium/bisphosphite ligand complex catalyst.

DETAILED DESCRIPTION

The hydroformylation process described herein employs starting materials comprising: (A) a gas comprising hydrogen and carbon monoxide, (B) an alkenyl-functional organosilicon compound, and (C) a rhodium/bisphosphite ligand catalyst. The starting materials may optionally further comprise: (D) a solvent.

Starting material (A), the gas used in the hydroformylation process, comprises carbon monoxide (CO) and hydrogen gas ($H_2$). For example, the gas may be syngas. As used herein, "syngas" (from synthesis gas) refers to a gas mixture that contains varying amounts of CO and $H_2$. Production methods are well known and include, for example: (1) steam reforming and partial oxidation of natural gas or liquid hydrocarbons, and (2) the gasification of coal and/or biomass. CO and $H_2$ typically are the main components of syngas, but syngas may contain carbon dioxide and inert gases such as $CH_4$, $N_2$ and Ar. The molar ratio of $H_2$ to CO ($H_2$:CO molar ratio) varies greatly but may range from 1:100 to 100:1, alternatively 1:10 and 10:1. Syngas is commercially available and is often used as a fuel source or as an intermediate for the production of other chemicals. Alternatively, CO and $H_2$ from other sources (i.e., other than syngas) may be used as starting material (A) herein. Alternatively, the $H_2$:CO molar ratio in starting material (A) for use herein may be 3:1 to 1:3, alternatively 2:1 to 1:2, and alternatively 1:1.

The alkenyl-functional organosilicon compound has, per molecule, at least one alkenyl group covalently bonded to silicon. Alternatively, the alkenyl-functional organosilicon compound may have, per molecule, more than one alkenyl group covalently bonded to silicon. Starting material (B) may be one alkenyl-functional organosilicon compound. Alternatively, starting material (B) may comprise two or more alkenyl-functional organosilicon compounds that differ from one another. For example, the alkenyl-functional organosilicon compound may comprise one or both of (B1) a silane and (B2) a polyorganosiloxane.

Starting material (B1), the alkenyl-functional silane, may have formula (B1-1): $R^{A}_{x}SiR^{4}_{(4-x)}$, where each $R^{A}$ is an independently selected alkenyl group of 2 to 8 carbon atoms; each $R^4$ is independently selected from the group consisting of an alkyl group of 1 to 18 carbon atoms, an aryl group of 6 to 18 carbon atoms, an acyloxy group of 2 to 18 carbon atoms, and a hydrocarbonoxy-functional group of 1 to 18 carbon atoms; and subscript x is 1 to 4. Alternatively, subscript x may be 1 or 2, alternatively 2, and alternatively 1. Alternatively, each $R^4$ may be independently selected from the group consisting of an alkyl group of 1 to 18 carbon atoms, an aryl group of 6 to 18 carbon atoms, an acyloxy group of 1 to 18 carbon atoms, and a hydrocarbonoxy-functional group of 1 to 18 carbon atoms. Alternatively, each $R^4$ may be independently selected from the group consisting of an alkyl group of 1 to 18 carbon atoms, an aryl group of 6 to 18 carbon atoms, and an alkoxy-functional group of 1 to 18 carbon atoms. Alternatively, each $R^4$ in formula (B1-1) may be independently selected from the group consisting of an alkyl group of 1 to 18 carbon atoms, an aryl group of 6 to 18 carbon atoms, and a hydrocarbonoxy-functional group of 1 to 18 carbon atoms.

The alkenyl group for $R^A$ may have terminal alkenyl functionality, e.g., $R^A$ may have formula

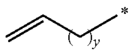

where subscript y is 0 to 6 and * denotes a point of attachment (i.e., to a silicon atom). Alternatively, each $R^A$ may be independently selected from the group consisting of vinyl, allyl, and hexenyl. Alternatively, each $R^A$ may be independently selected from the group consisting of vinyl and allyl. Alternatively, each $R^A$ may be vinyl. Alternatively, each $R^A$ may be allyl.

Suitable alkyl groups for $R^4$ may be linear, branched, cyclic, or combinations of two or more thereof. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 18 carbon atoms), and the alkyl groups are further exemplified by cycloalkyl groups such as cyclopropyl, cyclobutyl, cyclopentyl, and cyclohexyl. Alternatively, the alkyl group for $R^4$ may be selected from the group consisting of methyl, ethyl, propyl and butyl; alternatively methyl, ethyl, and propyl; alternatively methyl and ethyl. Alternatively, the alkyl group for $R^4$ may be methyl.

Suitable aryl groups for $R^4$ may be monocyclic or polycyclic and may have pendant hydrocarbyl groups. For example, the aryl groups for $R^4$ include phenyl, tolyl, xylyl, and naphthyl and further include aralkyl groups such as benzyl, 1-phenylethyl and 2-phenylethyl. Alternatively, the aryl group for $R^4$ may be monocyclic, such as phenyl, tolyl, or benzyl; alternatively the aryl group for $R^4$ may be phenyl.

Suitable hydrocarbonoxy-functional groups for $R^4$ may have the formula —$OR^5$ or the formula —$OR^3$—$OR^5$, where each $R^3$ is an independently selected divalent hydrocarbyl group of 1 to 18 carbon atoms, and each $R^5$ is independently selected from the group consisting of the alkyl groups of 1-18 carbon atoms and the aryl groups of 6-18 carbon atoms, which are as described and exemplified above for $R^4$. Examples of divalent hydrocarbyl groups for $R^3$ include alkylene group such as ethylene, propylene, butylene, or hexylene; an arylene group such as phenylene, or an alkylarylene group such as:

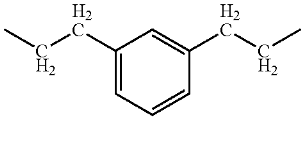

or

-continued

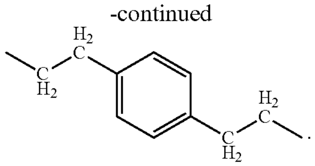

Alternatively, $R^3$ may be an alkylene group such as ethylene. Alternatively, the hydrocarbonoxy-functional group may be an alkoxy-functional group such as methoxy, ethoxy, propoxy, or butoxy; alternatively methoxy or ethoxy, and alternatively methoxy.

Suitable acyloxy groups for $R^4$ may have the formula

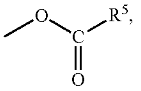

where $R^5$ is as described above. Examples of suitable acyloxy groups include acetoxy. Alkenyl-functional acyloxysilanes and methods for their preparation are known in the art, for example, in U.S. Pat. No. 5,387,706 to Rasmussen, et al., and U.S. Pat. No. 5,902,892 to Larson, et al.

Suitable alkenyl-functional silanes are exemplified by alkenyl-functional trialkylsilanes such as vinyltrimethylsilane, vinyltriethylsilane, and allyltrimethylsilane; alkenyl-functional trialkoxysilanes such as allyltrimethoxysilane, vinyltrimethoxysilane, vinyltriethoxysilane, vinyltriisopropoxysilane, and vinyltris(methoxyethoxy)silane; alkenyl-functional dialkoxysilanes such as vinylphenyldiethoxysilane, vinylmethyldimethoxysilane, and vinylmethyldiethoxysilane; alkenyl-functional monoalkoxysilanes such as trivinylmethoxysilane; alkenyl-functional triacyloxysilanes such as vinyltriacetoxysilane, and alkenyl-functional diacyloxysilanes such as vinylmethyldiacetoxysilane. All of these alkenyl-functional silanes are commercially available from Gelest Inc. of Morrisville, Pennsylvania, USA. Furthermore, alkenyl-functional silanes may be prepared by known methods, such as those disclosed in U.S. Pat. No. 4,898,961 to Baile, et al. and U.S. Pat. No. 5,756,796 to Davern, et al.

Alternatively, (B) the alkenyl-functional organosilicon compound may comprise (B2) an alkenyl-functional polyorganosiloxane. Said polyorganosiloxane may be cyclic, linear, branched, resinous, or a combination of two or more thereof. Said polyorganosiloxane may comprise unit formula (B2-1): $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(SiO_{4/2})_g(ZO_{1/2})_h$; where $R^4$ and $R^4$ are as described above; each Z is independently selected from the group consisting of a hydrogen atom and $R^5$ (where $R^5$ is as described above), subscripts a, b, c, d, e, f, and g represent numbers of each unit in formula (B2-1) and have values such that subscript a≥0, subscript b≥0, subscript c≥0, subscript d≥0, subscript e≥0, subscript f≥0, and subscript g≥0; a quantity (a+b+c+d+e+f+g)≥2, and a quantity (b+d+f)≥1, and subscript h has a value such that 0≥h/(e+f+g)≥1.5. At the same time, the quantity (a+b+c+d+e+f+g) may be ≤10,000. Alternatively, in formula (B-2-1), each $R^4$ may be independently selected from the group consisting of a hydrogen atom, an alkyl group of 1 to 18 carbon atoms, an aryl group of 6 to 18 carbon atoms, and a hydrocarbonoxy-functional group of 1 to 18 carbon atoms. Alternatively, each $R^4$ may be independently selected from the group consisting of an alkyl group of 1 to 18 carbon atoms, an aryl group of 6 to 18 carbon atoms, and an alkoxy-functional group of 1 to 18 carbon atoms. Alternatively, each $R^4$ may be independently selected from the group consisting of an alkyl group of 1 to 18 carbon atoms and an aryl group of 6 to 18 carbon atoms. Alternatively, each Z may be hydrogen or an alkyl group of 1 to 6 carbon atoms. Alternatively, each Z may be hydrogen.

Alternatively, (B2) the alkenyl-functional polyorganosiloxane may comprise (B2-2) a linear polydiorganosiloxane having, per molecule, at least one alkenyl group; alternatively at least two alkenyl groups (e.g., when in formula B2-1) above, subscripts e=f=g=0). For example, said polydiorganosiloxane may comprise unit formula (B2-3): $(R^4_3SiO_{1/2})_a(R^{A}R^4_2SiO_{2/2})_b(R^4_2SiO_{2/2})_c(R^{A}R^4SiO_{2/2})_d$, where $R^{A}$ and $R^4$ are as described above, subscript a is 0, 1, or 2; subscript b is 0, 1, or 2, subscript c≥0, subscript d≥0, with the provisos that a quantity (b+d)≥1, a quantity (a+b) =2, and a quantity (a+b+c+d)≥2. Alternatively, in unit formula (B2-3) the quantity (a+b+c+d) may be at least 3, alternatively at least 4, and alternatively >50. At the same time in unit formula (B2-3), the quantity (a+b+c+d) may be less than or equal to 10,000; alternatively less than or equal to 4,000; alternatively less than or equal to 2,000; alternatively less than or equal to 1,000; alternatively less than or equal to 500; alternatively less than or equal to 250. Alternatively, in unit formula (B2-3) each $R^4$ may be independently selected from the group consisting of alkyl and aryl; alternatively methyl and phenyl. Alternatively, each $R^4$ in unit formula (B2-3) may be an alkyl group; alternatively each $R^4$ may be methyl.

Alternatively, the polydiorganosiloxane of unit formula (B2-3) may be selected from the group consisting of: unit formula (B2-4): $(R^4_2R^{A}SiO_{1/2})_2(R^4_2SiO_{2/2})_m(R^4R^{A}SiO_{2/2})_n$, unit formula (B2-5): $(R^4_3SiO_{1/2})_2(R^4_2SiO_{2/2})_o(R^4R^{A}SiO_{2/2})_p$, or a combination of both (B2-4) and (B2-5).

In formulae (B2-4) and (B2-5), each $R^4$ and $R^{A}$ are as described above. Subscript m may be 0 or a positive number. Alternatively, subscript m may be at least 2. Alternatively subscript m be 2 to 2,000. Subscript n may be 0 or a positive number. Alternatively, subscript n may be 0 to 2000. Subscript o may be 0 or a positive number. Alternatively, subscript o may be 0 to 2000. Subscript p is at least 2. Alternatively subscript p may be 2 to 2000.

Starting material (B2) may comprise an alkenyl-functional polydiorganosiloxane such as i) bis-dimethylvinylsiloxy-terminated polydimethylsiloxane, ii) bis-dimethylvinylsiloxy-terminated poly(dimethylsiloxane/methylvinylsiloxane), iii) bis-dimethylvinylsiloxy-terminated polymethylvinylsiloxane, iv) bis-trimethylsiloxy-terminated poly(dimethylsiloxane/methylvinylsiloxane), v) bis-trimethylsiloxy-terminated polymethylvinylsiloxane, vi) bis-dimethylvinylsiloxy-terminated poly(dimethylsiloxane/methylphenylsiloxane/methylvinylsiloxane), vii) bis-dimethylvinylsiloxy-terminated poly(dimethylsiloxane/methylphenylsiloxane), viii) bis-dimethylvinylsiloxy-terminated poly(dimethylsiloxane/diphenylsiloxane), ix) bis-phenyl,methyl,vinyl-siloxy-terminated polydimethylsiloxane, x) bis-dimethylhexenylsiloxy-terminated polydimethylsiloxane, xi) bis-dimethylhexenylsiloxy-terminated poly (dimethylsiloxane/methylhexenylsiloxane), xii) bis-dimethylhexenylsiloxy-terminated polymethylhexenylsiloxane, xiii) bis-trimethylsiloxy-terminated poly(dimethylsiloxane/methylhexenylsiloxane), xiv) bis-trimethylsiloxy-terminated polymethylhexenylsiloxane, xv) bis-dimethylhexenyl-siloxy terminated poly(dimethylsiloxane/methylphenylsiloxane/methylhexenylsiloxane), xvi) bis-dimethylvinylsiloxy-terminated poly(dimethylsiloxane/methylhexenylsiloxane), xvii) bis-dimethylhexenyl-siloxy-terminated poly(dimethylsiloxane/methylphenylsiloxane), xviii) dimethylhexenyl-siloxy-terminated poly(dimethylsiloxane/diphenylsiloxane), and xix) a combination of two or more of i) to xviii).

Methods of preparing linear alkenyl-functional polydiorganosiloxanes described above for starting material (B2), such as hydrolysis and condensation of the corresponding organohalosilanes and oligomers or equilibration of cyclic polydiorganosiloxanes, are known in the art, see for example U.S. Pat. Nos. 3,284,406; 4,772,515; 5,169,920; 5,317,072; and 6,956,087, which disclose preparing linear polydiorganosiloxanes with alkenyl groups.

Examples of linear polydiorganosiloxanes having alkenyl groups are commercially available from, e.g., Gelest Inc. of Morrisville, Pennsylvania, USA under the tradenames DMS-V00, DMS-V03, DMS-V05, DMS-V21, DMS-V22, DMS-V25, DMS-V-31, DMS-V33, DMS-V34, DMS-V35, DMS-V41, DMS-V42, DMS-V43, DMS-V46, DMS-V51, DMS-V52.

Alternatively, (B2) the alkenyl-functional polyorganosiloxane may be cyclic, e.g., when in unit formula (B2-1), subscripts a=b=c=e=f=g=h=0. The cyclic alkenyl-functional polydiorganosiloxane may have unit formula (B2-7): $(R^4R^{A}SiO_{2/2})_d$, where $R^{A}$ and $R^4$ are as described above, and subscript d may be 3 to 12, alternatively 3 to 6, and alternatively 4 to 5. Examples of cyclic alkenyl-functional polydiorganosiloxanes include 2,4,6-trimethyl-2,4,6-trivinyl-cyclotrisiloxane, 2,4,6,8-tetramethyl-2,4,6,8-tetravinyl-cyclotetrasiloxane, 2,4,6,8,10-pentamethyl-2,4,6,8,10-pentavinyl-cyclopentasiloxane, and 2,4,6,8,10,12-hexamethyl-2,4,6,8,10,12-hexavinyl-cyclohexasiloxane. These cyclic alkenyl-functional polydiorganosiloxanes are known in the art and are commercially available from, e.g., Sigma-Aldrich of St. Louis, Missouri, USA; Milliken of Spartanburg, South Carolina, USA; and other vendors.

Alternatively, the cyclic alkenyl-functional polydiorganosiloxane may have unit formula (B2-8): $(R^4_2SiO_{2/2})_c(R^4R^{A}SiO_{2/2})_d$, where $R^4$ and $R^{A}$ are as described above, subscript c is 0 to 6, alternatively >0 to 6, and subscript d is 3 to 12. Alternatively, in formula (B2-8), c may be 3 to 6, and d may be 3 to 6.

Alternatively, (B2) the alkenyl-functional polyorganosiloxane may be oligomeric, e.g., when in unit formula (B2-1) above the quantity (a+b+c+d+e+f+g)≤50, alternatively ≤40, alternatively ≤30, alternatively ≤25, alternatively ≤20, alternatively ≤10, alternatively ≤5, alternatively ≤4, alternatively ≤3. The oligomer may be cyclic, linear, branched, or a combination thereof. The cyclic oligomers are as described above as starting material (B2-6).

Examples of linear alkenyl-functional polyorganosiloxane oligomers may have formula (B2-10):

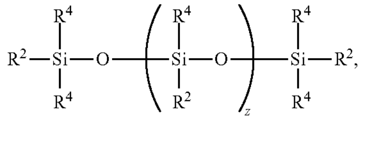

where $R^4$ is as described above, each $R^2$ is independently selected from the group consisting of $R^4$ and $R^{A}$, with the proviso that at least one $R^2$, per molecule, is $R^A$, and subscript z is 0 to 48. Examples of linear alkenyl-functional polyorganosiloxane oligomers may have include 1,3-divinyl-1,1,3,3-tetramethyldisiloxane; 1,1,1,3,3-pentamethyl-3-vinyl-disiloxane; 1,1,1,3,5,5,5-heptamethyl-3-vinyl-trisiloxane, all of which are commercially available, e.g., from Gelest, Inc. of Morrisville, Pennsylvania, USA or Sigma-Aldrich of St. Louis, Missouri, USA.

Alternatively, the alkenyl-functional polyorganosiloxane oligomer may be branched. The branched oligomer may have general formula (B2-11): $R^ASiR^{12}_3$, where $R^A$ is as described above and each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that $0 \leq ii \leq 100$. At least two of $R^{12}$ may be $—OSi(R^{14})_3$. Alternatively, all three of $R^{12}$ may be $—OSi(R^{14})_3$.

Alternatively, in formula (B2-11) when each $R^{12}$ is $—OSi(R^{14})_3$, each $R^{14}$ may be $—OSi(R^{15})_3$ moieties such that the branched polyorganosiloxane oligomer has the following structure:

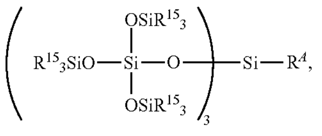

where $R^A$ and $R^{15}$ are as described above. Alternatively, each $R^{15}$ may be an $R^{13}$, as described above, and each $R^{13}$ may be methyl.

Alternatively, in formula (B2-11), when each $R^{12}$ is $—OSi(R^{14})_3$, one $R^{14}$ may be $R^{13}$ in each $—OSi(R^{14})_3$ such that each $R^{12}$ is $—OSiR^{13}(R^{14})_2$. Alternatively, two $R^{14}$ in $—OSiR^{13}(R^{14})_2$ may each be $—OSi(R^{15})_3$ moieties such that the branched polyorganosiloxane oligomer has the following structure:

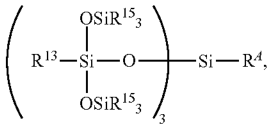

where $R^A$, $R^{13}$, and $R^{15}$ are as described above. Alternatively, each $R^{15}$ may be an $R^{13}$, and each $R^{13}$ may be methyl.

Alternatively, in formula (B2-11), one $R^{12}$ may be $R^{13}$, and two of $R^{12}$ may be $—OSi(R^{14})_3$. When two of $R^{12}$ are $—OSi(R^{14})_3$, and one $R^{14}$ is $R^{13}$ in each $—OSi(R^{14})_3$ then two of are $—OSiR^{13}(R^{14})_2$. Alternatively, each $R^{14}$ in $—OSiR^{13}(R^{14})_2$ may be $—OSi(R^5)_3$ such that the branched polyorganosiloxane oligomer has the following structure:

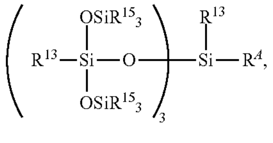

where $R^A$, $R^{13}$, and $R^{15}$ are as described above. Alternatively, each $R^{15}$ may be an $R^{13}$, and each $R^{13}$ may be methyl. Alternatively, the alkenyl-functional branched polyorganosiloxane may have 3 to 16 silicon atoms per molecule, alternatively 4 to 16 silicon atoms per molecule, and alternatively 4 to 10 silicon atoms per molecule. Examples of alkenyl-functional branched polyorganosiloxane oligomers include vinyl-tris(trimethyl)siloxy)silane, which has formula:

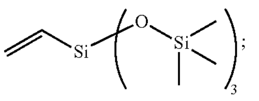

(1,1,1,3,5,7,9,9,9-nonamethyl-3,7-bis((trimethylsilyl)oxy)-5-vinylpentasiloxane), which has formula

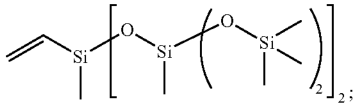

and (5-((1,1,1,3,5,5,5-heptamethyltrisiloxan-3-yl)oxy)-1,1,1,3,7,9,9,9-octamethyl-3,7-bis((trimethylsilyl)oxy)-5-vinylpentasiloxane), which has formula

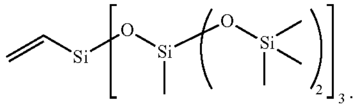

Branched alkenyl-functional polyorganosiloxane oligomers described above may be prepared by known methods, such as those disclosed in "Testing the Functional Tolerance of the Piers-Rubinsztajn Reaction: A new Strategy for Functional Silicones" by Grande, et al. Supplementary Material (ESI) for Chemical Communications, © The Royal Society of Chemistry 2010.

Alternatively, (B2) the alkenyl-functional polyorganosiloxane may be branched, such as the branched oligomer described above and/or a branched alkenyl-functional polyorganosiloxane that may have, e.g., more alkenyl groups per molecule and/or more polymer units than the branched oligomer described above (e.g., in formula (B2-1) when the quantity (a+b+c+d+e+f+g)>50). The branched alkenyl-functional polyorganosiloxane may have (in formula (B2-1)) a quantity (e+f+g) sufficient to provide >0 to 5 mol % of trifunctional and/or quadrifunctional units to the branched alkenyl-functional polyorganosiloxane.

For example, the branched alkenyl-functional polyorganosiloxane may comprise a Q branched polyorganosiloxane of unit formula (B2-13): $(R^4_3SiO_{1/2})_q(R^4_2R^ASiO_{1/2})_r(R^4_2SiO_{2/2})_s(SiO_{4/2})_t$, where $R^4$ and $R^A$ are as described above, and subscripts q, r, s, and t have average values such that $2 \geq q \geq 0$, $4 \geq r \geq 0$, $995 \geq s \geq 4$, t=1, (q+r)=4, and (q+r+s+t) has a value sufficient to impart a viscosity >170 mPa·s measured by rotational viscometry (as described below with the test methods) to the branched polyorganosiloxane. Alternatively, viscosity may be >170 mPa·s to 1000 mPa·s, alternatively >170 to 500 mPa·s, alternatively 180 mPa·s to 450 mPa·s, and alternatively 190 mPa·s to 420 mPa·s. Suitable Q branched polyorganosiloxanes for starting material (B2-12)

are known in the art and can be made by known methods, exemplified by those disclosed in U.S. Pat. No. 6,806,339 to Cray, et al. and U.S. Patent Publication 2007/0289495 to Cray, et al.

Alternatively, the branched alkenyl-functional polyorganosiloxane may comprise formula (B2-14): $[R^{A}R^4_2Si—(O—SiR^4_2)_x—O]_{(4-w)}—Si—[O—(R^4_2SiO)_vSiR^4_3]_w$, where $R^{A}$ and $R^4$ are as described above; and subscripts v, w, and x have values such that 200≥v≥1, 2≥w≥0, and 200≥x≥1. Alternatively, in this formula (B2-14), each $R^4$ is independently selected from the group consisting of methyl and phenyl, and each $R^{A}$ is independently selected from the group consisting of vinyl, allyl, and hexenyl. Branched polyorganosiloxane suitable for starting material (B2-14) may be prepared by known methods such as heating a mixture comprising a polyorganosilicate resin, and a cyclic polydiorganosiloxane or a linear polydiorganosiloxane, in the presence of a catalyst, such as an acid or phosphazene base, and thereafter neutralizing the catalyst.

Alternatively, the branched alkenyl-functional polyorganosiloxane for starting material (B2-11) may comprise a T branched polyorganosiloxane of unit formula (B2-15): $(R^4_3SiO_{1/2})_{aa}(R^{A}R^4_2SiO_{1/2})_{bb}(R^4_2SiO_{2/2})_{cc}(R^{A}R^4SiO_{2/2})_{cc}(R^4SiO_{3/2})_{dd}$, where $R^4$ and $R^{A}$ are as described above, subscript aa≥0, subscript bb≥0, subscript cc is 15 to 995, subscript dd≥0, and subscript ee≥0. Subscript aa may be 0 to 10. Alternatively, subscript aa may have a value such that: 12≥aa≥0; alternatively 10≥aa≥0; alternatively 7≥aa≥0; alternatively ≤≥aa≥0; and alternatively 3≥aa≥0. Alternatively, subscript bb≥1. Alternatively, subscript bb≥3. Alternatively, subscript bb may have a value such that: 12≥bb≥0; alternatively 12≥bb≥3; alternatively 10≥bb≥0; alternatively 7≥bb≥1; alternatively ≤≥bb≥2; and alternatively 7≥bb≥3. Alternatively, subscript cc may have a value such that: 800≥cc≥15; and alternatively 400≥cc≥15. Alternatively, subscript ee may have a value such that: 800≥ee≥0; 800≥ee≥15; and alternatively 400≥ee≥15. Alternatively, subscript ee may b 0. Alternatively, a quantity (cc+ee) may have a value such that 995≥(cc+ee)≥15. Alternatively, subscript dd≥1. Alternatively, subscript dd may be 1 to 10. Alternatively, subscript dd may have a value such that: 10≥dd≥0; alternatively ≤≥dd≥0; and alternatively dd=1. Alternatively, subscript dd may be 1 to 10, alternatively subscript dd may be 1 or 2. Alternatively, when subscript dd=1, then subscript bb may be 3 and subscript cc may be 0. The values for subscript bb may be sufficient to provide the silsesquioxane of unit formula (B2-15) with an alkenyl content of 0.1% to 1%, alternatively 0.2% to 0.6%, based on the weight of the silsesquioxane. Suitable T branched polyorganosiloxanes (silsesquioxanes) for starting material (B2-15) are exemplified by those disclosed in U.S. Pat. No. 4,374,967 to Brown, et al; U.S. Pat. No. 6,001,943 to Enami, et al.; U.S. Pat. No. 8,546,508 to Nabeta, et al.; and U.S. Pat. No. 10,155,852 to Enami.

Alternatively, (B2) the alkenyl-functional polyorganosiloxane may comprise an alkenyl-functional polyorganosilicate resin, which comprises monofunctional units ("M" units) of formula $R^{M}_3SiO_{1/2}$ and tetrafunctional silicate units ("Q" units) of formula $SiO_{4/2}$, where each $R^{M}$ is an independently selected monovalent hydrocarbon group; each $R^{M}$ may be independently selected from the group consisting of $R^4$ and $R^{A}$ as described above. Alternatively, each $R^{M}$ may be selected from the group consisting of alkyl, alkenyl and aryl. Alternatively, each $R^{M}$ may be selected from methyl, vinyl and phenyl. Alternatively, at least one-third, alternatively at least two thirds of the $R^{M}$ groups are methyl groups. Alternatively, the M units may be exemplified by $(Me_3SiO_{1/2})$, $(Me_2PhSiO_{1/2})$, and $(Me_2ViSiO_{1/2})$. The polyorganosilicate resin is soluble in solvents such as those described herein as starting material (D), exemplified by liquid hydrocarbons, such as benzene, ethylbenzene, toluene, xylene, and heptane, or in liquid non-functional organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups, and/or hydrolyzable groups, described by moiety $(ZO_{1/2})$, above, and may comprise neopentamer of formula $Si(OSiR^{M}_3)_4$, where $R^{M}$ is as described above, e.g., the neopentamer may be tetrakis(trimethylsiloxy)silane. $^{29}Si$ NMR and $^{13}C$ NMR spectroscopies may be used to measure hydroxyl and alkoxy content and molar ratio of M and Q units, where said ratio is expressed as {M(resin)}/{Q(resin)}, excluding M and Q units from the neopentamer. M/Q ratio represents the molar ratio of the total number of triorganosiloxy groups (M units) of the resinous portion of the polyorganosilicate resin to the total number of silicate groups (Q units) in the resinous portion. M/Q ratio may be 0.5/l to 1.5/l, alternatively 0.6/l to 0.9/l.

The Mn of the polyorganosilicate resin depends on various factors including the types of hydrocarbon groups represented by $R^{M}$ that are present. The Mn of the polyorganosilicate resin refers to the number average molecular weight measured using GPC, when the peak representing the neopentamer is excluded from the measurement. The Mn of the polyorganosilicate resin may be 1,500 to 30,000; alternatively 1,500 to 15,000; alternatively >3,000 to 8,000 Da. Alternatively, Mn of the polyorganosilicate resin may be 3,500 to 8,000 Da.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use as starting material (B2). The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M units and Q units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^{M}_3SiX$, where $R^{M}$ is as described above and X represents a hydroxyl group or a hydrolyzable substituent, e.g., of formula OZ described above. Silanes with four hydrolyzable substituents may have formula $SiX^2_4$, where each $X^2$ is independently selected from the group consisting of halogen, alkoxy, and hydroxyl. Suitable alkali metal silicates include sodium silicate.

The polyorganosilicate resin prepared as described above typically contain silicon bonded hydroxyl groups, e.g., of formula, $HOSiO_{3/2}$. The polyorganosilicate resin may comprise up to 3.5% of silicon bonded hydroxyl groups, as measured by FTIR spectroscopy and/or NMR spectroscopy, as described above. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

Alternatively, the polyorganosilicate resin may further comprise 2% or less, alternatively 0.7% or less, and alternatively 0.3% or less, and alternatively 0.3% to 0.8% of units containing hydroxyl groups, e.g., those represented by formula $XSiO_{3/2}$ where $R^M$ is as described above, and X represents a hydrolyzable substituent, e.g., OH. The concentration of silanol groups (where X═OH) present in the polyorganosilicate resin may be determined using FTIR spectroscopy and/or NMR as described below.

For use herein, the polyorganosilicate resin further comprises one or more terminal alkenyl groups per molecule. The polyorganosilicate resin having terminal alkenyl groups may be prepared by reacting the product of Daudt, et al. with an alkenyl group-containing endblocking agent and an endblocking agent free of aliphatic unsaturation, in an amount sufficient to provide from 3 to 30 mole percent of alkenyl groups in the final product. Examples of endblocking agents include, but are not limited to, silazanes, siloxanes, and silanes. Suitable endblocking agents are known in the art and exemplified in U.S. Pat. No. 4,584,355 to Blizzard, et al.; U.S. Pat. No. 4,591,622 to Blizzard, et al.; and U.S. Pat. No. 4,585,836 Homan, et al. A single endblocking agent or a mixture of such agents may be used to prepare such resin.

Alternatively, the polyorganosilicate resin may comprise unit formula (B2-17): $(R^4_3SiO_{1/2})_{mm}(R^4_2R^ASiO_{1/2})_{nn}(SiO_{4/2})_{oo}(ZO_{1/2})_h$, where Z, $R^4$, and $R^A$, and subscript h are as described above and subscripts mm, nn and oo have average values such that mm≥0, nn>0, oo>0, and 0.5≤(mm+nn)/oo≤4. Alternatively, 0.6≤(mm+nn)/oo≤4; alternatively 0.7≤(mm+nn)/oo≤4, and alternatively 0.8≤(mm+nn)/oo≤4.

Alternatively, (B2) the alkenyl-functional polyorganosiloxane may comprise (B2-18) an alkenyl-functional silsesquioxane resin, i.e., a resin containing trifunctional (T) units of unit formula: $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(ZO_{1/2})_h$; where $R^4$ and $R^A$ are as described above, subscript f>1, 2<(e+f)<10,000; 0<(a+b)/(e+f)<3; 0<(c+d)/(e+f)<3; and 0<h/(e+f)<1.5. Alternatively, the alkenyl-functional silsesquioxane resin may comprise unit formula (B2-19): $(R^4SiO_{3/2})_e(R^ASiO_{3/2})_f(ZO_{1/2})_h$, where $R^4$, $R^A$, Z, and subscripts h, e and f are as described above. Alternatively, the alkenyl-functional silsesquioxane resin may further comprise difunctional (D) units of formulae $(R^4_2SiO_{2/2})_c(R^4R^ASiO_{2/2})_d$ in addition to the T units described above, i.e., a DT resin, where subscripts c and d are as described above. Alternatively, the alkenyl-functional silsesquioxane resin may further comprise monofunctional (M) units of formulae $(R^4_3SiO_{1/2})_a(R^4_2R^ASiO_{1/2})_b$, i.e., an MDT resin, where subscripts a and b are as described above for unit formula (B2-1).

Alkenyl-functional silsesquioxane resins are commercially available, for example. RMS-310, which comprises unit formula (B2-20): $(Me_2ViSiO_{1/2})_{25}(PhSiO_{3/2})_{75}$ dissolved in toluene, is commercially available from Dow Silicones Corporation of Midland, Michigan, USA. Alkenyl-functional silsesquioxane resins may be produced by the hydrolysis and condensation or a mixture of trialkoxy silanes using the methods as set forth in "Chemistry and Technology of Silicone" by Noll, Academic Press, 1968, chapter 5, p 190-245. Alternatively, alkenyl-functional silsesquioxane resins may be produced by the hydrolysis and condensation of a trichlorosilane using the methods as set forth in U.S. Pat. No. 6,281,285 to Becker, et al. and U.S. Pat. No. 5,010,159 to Bank, et al. Alkenyl-functional silsesquioxane resins comprising D units may be prepared by known methods, such as those disclosed in U.S. Patent Application 2020/0140619 and PCT Publication WO2018/204068 to Swier, et al.

Alternatively, starting material (B) the alkenyl-functional organosilicon compound may comprise (B3) an alkenyl-functional silazane. The alkenyl-functional silazane may have formula (B3-1): $[(R^1_{(3-gg)}R^A_{gg}Si)_{ff}NH_{(3-ff)}]_{hh}$, where $R^A$ is as described above; each $R^1$ is independently selected from the group consisting of an alkyl group and an aryl group; each subscript ff is independently 1 or 2; and subscript gg is independently 0, 1, or 2; where 1>hh>10. For $R^1$, the alkyl group and the aryl group may be the alkyl group and the aryl group as described above for $R^4$. Alternatively, subscript hh may have a value such that 1>hh>6.

Examples of alkenyl-functional silazanes include, $MePhViSiNH_2$, $Me_2ViSiNH_2$, $(ViMe_2Si)_2NH$, $(MePhViSi)_2NH$. Alkenyl-functional silazanes may be prepared by known methods, for example, reacting an alkenyl-functional halosilane with ammonia under anhydrous or substantially anhydrous conditions, and thereafter distilling the resulting reaction mixture to separate cyclic alkenyl-functional silazanes and linear alkenyl-functional silazanes, such as those disclosed in U.S. Pat. No. 2,462,635 to Haber; U.S. Pat. No. 3,243,404 to Martellock; and PCT Publication No. WO83/02948 to Dziark. Suitable alkenyl-functional silazanes are commercially available, for example, 2,4,6-trimethyl-2,4,6-trivinylcyclotrisilazane $(MeViSiNH)_3$ is available from Sigma-Aldrich of St. Louis, MO, USA; sym-tetramethyldivinyldisilazane $(ViMe_2Si)_2NH$ is available from Alfa Aesar; and 1,3-divinyl-1,3-diphenyl-1,3-dimethyldisilazane $(MePhViSi)_2NH$ is available from Gelest, Inc. of Morrisville, Pennsylvania, USA.

Starting material (B) may be any one of the alkenyl-functional organosilicon compounds described above. Alternatively, starting material (B) may comprise a mixture of two or more of the alkenyl-functional organosilicon compounds.

Starting material (C), the hydroformylation reaction catalyst for use herein comprises an activated complex of rhodium and a close ended bisphosphite ligand. The bisphosphite ligand may be symmetric or asymmetric. Alternatively, the bisphosphite ligand may be symmetric. The bisphosphite ligand may have formula (C1):

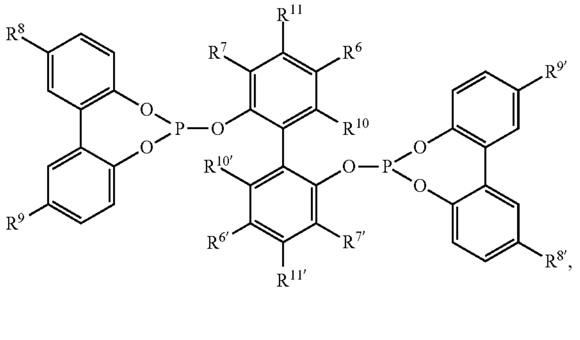

where $R^6$ and $R^{6'}$ are each independently selected from the group consisting of hydrogen, an alkyl group of at least one carbon atom, a cyano group, a halogen group, and an alkoxy group of at least one carbon atom; $R^7$ and $R^{7'}$ are each independently selected from the group consisting of an alkyl group of at least 3 carbon atoms and a group of formula —$SiR^{17}_3$, where each $R^{17}$ is an independently selected monovalent hydrocarbon group of 1 to 20 carbon atoms; $R^8$, $R^{8'}$, $R^9$, and $R^{9'}$ are each independently selected from the group consisting of hydrogen, an alkyl group, a cyano group, a halogen group, and an alkoxy group; and $R^{10}$, $R^{10'}$, $R^{11}$, and $R^{11'}$ are each independently selected from the group consisting of hydrogen and an alkyl group. Alternatively, one of $R^7$ and $R^{7'}$ may be hydrogen.

In formula (C1), $R^6$ and $R^{6'}$ may be alkyl groups of least one carbon atom, alternatively 1 to 20 carbon atoms. Suitable alkyl groups for $R^6$ and $R^{6'}$ may be linear, branched, cyclic, or combinations of two or more thereof. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 20 carbon atoms), and the alkyl groups are further exemplified by cycloalkyl groups such as cyclopropyl, cyclobutyl, cyclopentyl, and cyclohexyl. Alternatively, the alkyl group for $R^6$ and $R^{6'}$ may be selected from the group consisting of ethyl, propyl and butyl; alternatively propyl and butyl. Alternatively, the alkyl group for $R^6$ and $R^{6'}$ may be butyl. Alternatively, $R^6$ and $R^{6'}$ may be alkoxy groups, wherein the alkoxy group may have formula —$OR^{6''}$, where $R^{6''}$ is an alkyl group as described above for $R^6$ and $R^{6'}$.

Alternatively, in formula (C1), $R^6$ and $R^{6'}$ may be independently selected from alkyl groups of 1 to 6 carbon atoms and alkoxy groups of 1 to 6 carbon atoms. Alternatively, $R^6$ and $R^{6'}$ may be alkyl groups of 2 to 4 carbon atoms. Alternatively, $R^6$ and $R^{6'}$ may be alkoxy groups of 1 to 4 carbon atoms. Alternatively, $R^6$ and $R^{6'}$ may be butyl groups, alternatively tert-butyl groups. Alternatively, $R^6$ and $R^{6'}$ may be methoxy groups.

In formula (C1), $R^7$ and $R^{7'}$ may be alkyl groups of least three carbon atoms, alternatively 3 to 20 carbon atoms. Suitable alkyl groups for $R^7$ and $R^{7'}$ may be linear, branched, cyclic, or combinations of two or more thereof. The alkyl groups are exemplified by propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 20 carbon atoms), and the alkyl groups are further exemplified by cycloalkyl groups such as cyclopropyl, cyclobutyl, cyclopentyl, and cyclohexyl. Alternatively, the alkyl group for $R^7$ and $R^{7'}$ may be selected from the group consisting of propyl and butyl. Alternatively, the alkyl group for $R^7$ and $R^{7'}$ may be butyl.

Alternatively, in formula (C1), $R^7$ and $R^{7'}$ may be a silyl group of formula —$SiR^{17}_3$, where each $R^{17}$ is an independently selected monovalent hydrocarbon group of 1 to 20 carbon atoms. The monovalent hydrocarbon group may be an alkyl group of 1 to 20 carbon atoms, as described above for $R^6$ and $R^{6'}$.

Alternatively, in formula (C1), $R^7$ and $R^{7'}$ may each be independently selected alkyl groups, alternatively alkyl groups of 3 to 6 carbon atoms. Alternatively, $R^7$ and $R^{7'}$ may be alkyl groups of 3 to 4 carbon atoms. Alternatively, $R^7$ and $R^{7'}$ may be butyl groups, alternatively tert-butyl groups.

In formula (C1), $R^8$, $R^{8'}$, $R^9$, $R^{9'}$ may be alkyl groups of at least one carbon atom, as described above for $R^6$ and $R^{6'}$.

Alternatively, $R^8$ and $R^{8'}$ may be independently selected from the group consisting of hydrogen and alkyl groups of 1 to 6 carbon atoms.

Alternatively, $R^8$ and $R^{8'}$ may be hydrogen. Alternatively, in formula (C1), $R^{9'}$ and $R^{9'}$ may be independently selected from the group consisting of hydrogen and alkyl groups of 1 to 6 carbon atoms. Alternatively, $R^9$ and $R^{9'}$ may be hydrogen.

In formula (C1), $R^{10}$ and $R^{10'}$ may be hydrogen atoms or alkyl groups of least one carbon atom, alternatively 1 to 20 carbon atoms. The alkyl groups for $R^{10}$ and $R^{10'}$ may be as described above for $R^6$ and $R^{6'}$. Alternatively, $R^{10}$ and $R^{10'}$ may be methyl. Alternatively, $R^{10}$ and $R^{10'}$ may be hydrogen.

In formula (C1), $R^{11}$ and $R^{11'}$ may be hydrogen atoms or alkyl groups of least one carbon atom, alternatively 1 to 20 carbon atoms. The alkyl groups for $R^{11}$ and $R^{11'}$ may be as described above for $R^6$ and $R^{6'}$. Alternatively, $R^{11}$ and $R^{11'}$ may be hydrogen.

Alternatively, the ligand of formula (C1) may be selected from the group consisting of (C1-1) 6,6'-[[3,3',5,5'-tetrakis(1,1-dimethylethyl)-1,1'-biphenyl]-2,2'-diyl]bis(oxy)]bis-dibenzo[d,f][1,3,2]dioxaphosphepin; (C1-2) 6,6'-[(3,3'-di-tert-butyl-5,5'-dimethoxy-1,1'-biphenyl-2,2'-diyl)bis(oxy)]bis(dibenzo[d,f][1,3,2]dioxaphosphepin); and a combination of both (C1-1) and (C1-2).

Alternatively, the ligand may comprise 6,6'-[[3,3',5,5'-tetrakis(1,1-dimethylethyl)-1,1'-biphenyl-2,2'-diyl]bis(oxy)]bis-dibenzo[d,f][1,3,2]dioxaphosphepin, as disclosed at col. 11 of U.S. Pat. No. 10,023,516 (see also U.S. Pat. No. 7,446,231, which discloses this compound as Ligand D at col. 22 and U.S. Pat. No. 5,727,893 at col. 20, lines 40-60 as ligand F).

Alternatively, the ligand may comprise biphephos, which is commercially available from Sigma Aldrich and may be prepared as described in U.S. Pat. No. 9,127,030. (See also U.S. Pat. No. 7,446,231 ligand B at col. 21 and U.S. Pat. No. 5,727,893 at col. 20, lines 5-18 as ligand D).

Starting material (C), the rhodium/bisphosphite ligand complex catalyst, may be prepared by methods known in the art, such as those disclosed in U.S. Pat. No. 4,769,498 to Billig, et al. at col. 20, line 50-col. 21, line 40 and U.S. Pat. No. 10,023,516 to Brammer et al. col. 11, line 35-col. 12, line 12 by varying appropriate starting materials. For example, the rhodium/bisphosphite ligand complex may be prepared by a process comprising combining a rhodium precursor and the bisphosphite ligand (C1) described above under conditions to form the complex, which complex may then be introduced into a hydroformylation reaction medium comprising one or both of starting materials (A) and/or (B), described above.

Alternatively, the rhodium/bisphosphite ligand complex may be formed in situ by introducing the rhodium catalyst precursor into the reaction medium, and introducing (C1) the bisphosphite ligand into the reaction medium (e.g., before, during, and/or after introduction of the rhodium catalyst precursor), for the in situ formation of the rhodium/bisphosphite ligand complex. The rhodium/bisphosphite ligand complex can be activated by heating and/or exposure to starting material (A) to form the (C) rhodium/bisphosphite ligand complex catalyst. Rhodium catalyst precursors are exemplified by rhodium dicarbonyl acetylacetonate, $Rh_2O_3$, $Rh_4(CO)_{12}$, $Rh_6(CO)_{16}$, and $Rh(NO_3)_3$.

For example, a rhodium precursor, such as rhodium dicarbonyl acetylacetonate, optionally starting material (D), a solvent, and (C1) the bisphosphite ligand may be combined, e.g., by any convenient means such as mixing. The resulting rhodium/bisphosphite ligand complex may be introduced into the reactor, optionally with excess bisphosphite ligand. Alternatively, the rhodium precursor, (D) the solvent, and the bisphosphite ligand may be combined in the reactor with starting material (A) and/or (B), the alkenyl-functional organosilicon compound; and the rhodium/bisphosphite ligand complex may form in situ. The relative amounts of bisphosphite ligand and rhodium precursor are sufficient to provide a molar ratio of bisphosphite ligand/Rh of 10/1 to 1/1, alternatively 5/1 to 1/1, alternatively 3/1 to 1/1, alternatively 2.5/1 to 1.5/1. In addition to the rhodium/bisphosphite ligand complex, excess (e.g., not complexed) bisphosphite ligand may be present in the reaction mixture. The excess bisphosphite ligand may be the same as, or different from, the bisphosphite ligand in the complex.

The amount of (C) the rhodium/bisphosphite ligand complex catalyst (catalyst) is sufficient to catalyze hydroformylation of (B) the alkenyl-functional organosilicon compound. The exact amount of catalyst will depend on various factors including the type of alkenyl-functional organosilicon compound selected for starting material (B), its exact alkenyl content, and the reaction conditions such as temperature and pressure of starting material (A). However, the amount of (C) the catalyst may be sufficient to provide a rhodium metal concentration of at least 0.1 ppm, alternatively 0.15 ppm, alternatively 0.2 ppm, alternatively 0.25 ppm, and alternatively 0.5 ppm, based on the weight of (B) the alkenyl-functional organosilicon compound. At the same time, the amount of (C) the catalyst may be sufficient to provide a rhodium metal concentration of up to 300 ppm, alternatively up to 100 ppm, alternatively up to 20 ppm, and alternatively up to 5 ppm, on the same basis. Alternatively, the amount of (C) the catalyst may be sufficient to provide 0.1 ppm to 300 ppm, alternatively 0.2 ppm to 100 ppm, alternatively, 0.25 ppm to 20 ppm, and alternatively 0.5 ppm to 5 ppm, based on the weight of (B) the alkenyl-functional organosilicon compound.

The hydroformylation process reaction may run without additional solvents. Alternatively, the hydroformylation process reaction may be carried out with a solvent, for example to facilitate mixing and/or delivery of one or more of the starting materials described above, such as the (C) catalyst and/or starting material (B), when a solvent such as an alkenyl-functional polyorganosilicate resin is selected for starting material (B). The solvent is exemplified by aliphatic or aromatic hydrocarbons, which can dissolve the starting materials, e.g., toluene, xylene, benzene, hexane, heptane, decane, cyclohexane, or a combination of two or more thereof. Additional solvents include THF, dibutyl ether, diglyme, and Texanol. Without wishing to be bound by theory, it is thought that solvent may be used to reduce the viscosity of the starting materials. The amount of solvent is not critical, however, when present, the amount of solvent may be 5% to 70% based on weight of starting material (B) the alkenyl-functional organosilicon compound.

In the process described herein, step 1) is performed at relatively low temperature. For example, step 1) may be performed at a temperature of at least 30° C., alternatively at least 50° C., and alternatively at least 70° C. At the same time, the temperature in step 1) may be up to 150° C.; alternatively up to 100° C.; alternatively up to 90° C., and alternatively up to 80° C. Without wishing to be bound by theory, it is thought that lower temperatures, e.g., 30° C. to 90° C., alternatively 40° C. to 90° C., alternatively 50° C. to 90° C., alternatively 60° C. to 90° C., alternatively 70° C. to 90° C., alternatively 80° C. to 90° C., alternatively 30° C. to 60° C., alternatively 50° C. to 60° C. may be desired for achieving high selectivity and ligand stability.

In the process described herein, step 1) may be performed at a pressure of at least 101 kPa (15 psi), alternatively at least 206 kPa (30 psi), and alternatively at least 344 kPa (50 psi). At the same time, pressure in step 1) may be up to 6,895 kPa (1,000 psi), alternatively up to 1,379 kPa (200 psi), alternatively up to 1000 kPa (145 psi), and alternatively up to 689 kPa (100 psi). Alternatively, step 1) may be performed at 101 kPa to 6,895 kPa; alternatively 344 kPa to 1,379 kPa; alternatively 101 kPa to 1,000 kPa; and alternatively 344 kPa to 689 kPa. Without wishing to be bound by theory, it is thought that using relatively low pressures, e.g., < to 6,895 kPa in the process herein may be beneficial; the ligands described herein allow for low pressure hydroformylation processes, which have the benefits of lower cost and better safety than high pressure hydroformylation processes.

The hydroformylation process may be carried out in a batch, semi-batch, or continuous mode, using one or more suitable reactors, such as a fixed bed reactor, a fluid bed reactor, a continuous stirred tank reactor (CSTR), or a slurry reactor. The selection of (B) the alkenyl-functional organosilicon compound, and (C) the catalyst, and whether (D) the solvent, is used may impact the size and type of reactor used. One reactor, or two or more different reactors, may be used. The hydroformylation process may be conducted in one or more steps, which may be affected by balancing capital costs and achieving high catalyst selectivity, activity, lifetime, and ease of operability, as well as the reactivity of the particular starting materials and reaction conditions selected, and the desired product.

Alternatively, the hydroformylation process may be performed in a continuous manner. For example, the process used may be as described in U.S. Pat. No. 10,023,516 except that the olefin feed stream and catalyst described therein are replaced with (B) the alkenyl-functional organosilicon compound and (C) the rhodium/bisphosphite ligand complex catalyst, each described herein.

Step 1) of the hydroformylation process forms a reaction fluid comprising the aldehyde-functional organosilicon compound. The reaction fluid may further comprise additional materials, such as those which have either been deliberately employed, or formed in situ, during step 1) of the process. Examples of such materials that can also be present include unreacted (B) alkenyl-functional organosilicon compound, unreacted (A) carbon monoxide and hydrogen gases, and/or in situ formed side products, such as ligand degradation products and adducts thereof, and high boiling liquid aldehyde condensation byproducts, as well as (D) a solvent, if employed. The term "ligand degradation product" includes but is not limited to any and all compounds resulting from one or more chemical transformations of at least one of the ligand molecules used in the process.

The hydroformylation process may further comprise one or more additional steps such as: 2) recovering (C) the rhodium/bisphosphite ligand complex catalyst from the reaction fluid comprising the aldehyde-functional organosilicon compound. Recovering (C) the rhodium/bisphosphite ligand complex catalyst may be performed by methods known in the art, including but not limited to adsorption and/or membrane separation (e.g., nanofiltration). Suitable recovery methods are as described, for example, in U.S. Pat. No. 5,681,473 to Miller, et al.; U.S. Pat. No. 8,748,643 to Priske, et al.; and 10,155,200 to Geilen, et al.

However, one benefit of the process described herein is that (C) the catalyst need not be removed and recycled. Due to the low level of Rh needed, it may be more cost effective not to recover and recycle (C) the catalyst; and the aldehyde-functional organosilicon compound produced by the process may be stable even when the catalyst is not removed. Therefore, alternatively, the process described above may be performed without step 2).

Alternatively, the hydroformylation process may further comprise 3) purification of the reaction product. For example, the aldehyde-functional organosilicon compound may be isolated from the additional materials, described above, by any convenient means such as stripping and/or distillation, optionally with reduced pressure.

Aldehyde-Functional Organosilicon Compound

The hydroformylation process described above produces an aldehyde-functional organosilicon compound. The aldehyde-functional organosilicon compound has, per molecule, at least one aldehyde-functional group covalently bonded to silicon. Alternatively, the aldehyde-functional organosilicon compound may have, per molecule, more than one aldehyde-functional group covalently bonded to silicon. The aldehyde-functional group covalently bonded to silicon may have formula:

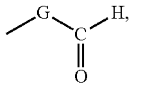

where G is a divalent hydrocarbon group free of aliphatic unsaturation that has 2 to 8 carbon atoms. G may be linear or branched. Examples of divalent hydrocarbyl groups for G include alkane-diyl groups of empirical formula $—C_rH_{2r}—$, where subscript r is 2 to 8. The alkane-diyl group may be a linear alkane-diyl, e.g., $—CH_2—CH_2—$, $—CH_2—CH_2—CH_2—$, $—CH_2—CH_2—CH_2—CH_2—$, or $—CH_2—CH_2—CH_2—CH_2—CH_2—CH_2—$, or a branched alkane-diyl, e.g.,

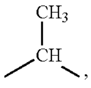, 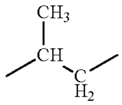, 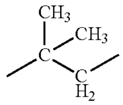, or 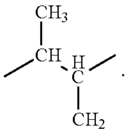.

Alternatively, each G may be an alkane-diyl group of 2 to 6 carbon atoms; alternatively of 2, 3, or 6 carbon atoms. The aldehyde-functional organosilicon compound may be have any one of the formulas above for (B) the alkenyl-functional organosilicon compound wherein at least one $R^4$ is replaced with an aldehyde-functional group. For example, the aldehyde-functional organosilicon compound may comprise an aldehyde-functional silane and/or an aldehyde-functional polyorganosiloxane.

The aldehyde-functional silane may have formula (E1): $R^{Ald}_xSiR^4_{(4-x)}$, where each $R^{Ald}$ is an independently selected group of the formula

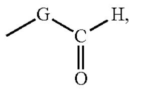

as described above; and $R^4$ and subscript x are as described above, e.g., each $R^4$ is independently selected from the group consisting of an alkyl group of 1 to 18 carbon atoms and an aryl group of 6 to 18 carbon atoms; and subscript x is 1 to 4.

Suitable aldehyde-functional silanes are exemplified by aldehyde-functional trialkylsilanes such as (propyl-aldehyde)-trimethylsilane, (propyl-aldehyde)-triethylsilane, and (butyl-aldehyde)trimethylsilane.

Alternatively, the aldehyde-functional organosilicon compound may comprise (E2) an aldehyde-functional polyorganosiloxane. Said aldehyde-functional polyorganosiloxane may be cyclic, linear, branched, resinous, or a combination of two or more thereof. Said aldehyde-functional polyorganosiloxane may comprise unit formula (E2-1): $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(SiO_{4/2})_g(ZO_{1/2})_h$; where each $R^{Ald}$ is an independently selected aldehyde group of the formula

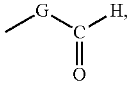

as described above, and G, $R^4$, Z, and subscripts a, b, c, d, e, f, g, and h are as described above.

Alternatively, (E2) the aldehyde-functional polyorganosiloxane may comprise (E2-2) a linear polydiorganosiloxane having, per molecule, at least one aldehyde-functional group; alternatively at least two aldehyde-functional groups (e.g., when in the formula (E2-1) for the aldehyde-functional polyorganosiloxane above, subscripts e=f=g=0). For example, said polydiorganosiloxane may comprise unit formula (E2-3): $(R^4_3SiO_{1/2})_a(R^{Ald}R^4_2SiO_{2/2})_b(R^4_2SiO_{2/2})_c(R^{Ald}R^4SiO_{2/2})_d$, where $R^{Ald}$, $R^4$, and subscripts a, b, c, and d are as described above.

Alternatively, the linear aldehyde-functional polydiorganosiloxane of unit formula (E2-3) may be selected from the group consisting of: unit formula (E2-4): $(R^4_2R^{Ald}SiO_{2/2})_2(R^4_2SiO_{2/2})_m(R^4R^{Ald}SiO_{2/2})_n$, unit formula (E2-5): $(R^4_3SiO_{1/2})_2(R^4_2SiO_{2/2})_o(R^4R^{Ald}SiO_{2/2})_p$, or a combination of both (E2-4) and (E2-5), where in formulae (E2-4) and (E2-5), $R^4$, $R^{Ald}$, and subscripts m, n, o, and p are as described above.

The linear aldehyde-functional polydiorganosiloxane (E2) may comprise an aldehyde-functional polydiorganosiloxane such as i) bis-dimethyl(propyl-aldehyde)siloxy-terminated polydimethylsiloxane, ii) bis-dimethyl(propyl-aldehyde)siloxy-terminated poly(dimethylsiloxane/methyl (propyl-aldehyde)siloxane), iii) bis-dimethyl(propyl-aldehyde)siloxy-terminated polymethyl(propyl-aldehyde) siloxane, iv) bis-trimethylsiloxy-terminated poly (dimethylsiloxane/methyl(propyl-aldehyde)siloxane), v) bis-trimethylsiloxy-terminated polymethyl(propyl-aldehyde)siloxane, vi) bis-dimethyl(propyl-aldehyde)siloxy-terminated poly(dimethylsiloxane/methylphenylsiloxane/methyl(propyl-aldehyde)siloxane), vii) bis-dimethyl (propyl-aldehyde)siloxy-terminated poly(dimethylsiloxane/methylphenylsiloxane), viii) bis-dimethyl(propyl-aldehyde) siloxy-terminated poly(dimethylsiloxane/diphenylsiloxane), ix) bis-phenyl,methyl,(propyl-aldehyde)-siloxy-terminated polydimethylsiloxane, x) bis-dimethyl(heptyl-aldehyde)siloxy-terminated polydimethylsiloxane, xi) bis-dimethyl (heptyl-aldehyde)siloxy-terminated poly(dimethylsiloxane/methyl(heptyl-aldehyde)siloxane), xii) bis-dimethyl(heptyl-aldehyde)siloxy-terminated polymethyl(heptyl-aldehyde) siloxane, xiii) bis-trimethylsiloxy-terminated poly (dimethylsiloxane/methyl(heptyl-aldehyde)siloxane), xiv) bis-trimethylsiloxy-terminated polymethyl(heptyl-aldehyde)siloxane, xv) bis-dimethyl(heptyl-aldehyde)-siloxy terminated poly(dimethylsiloxane/methylphenylsiloxane/ methyl(heptyl-aldehyde)siloxane), xvi) bis-dimethyl(propyl-aldehyde)siloxy-terminated poly(dimethylsiloxane/methyl(heptyl-aldehyde)siloxane), xvii) bis-dimethyl (heptyl-aldehyde)-siloxy-terminated poly(dimethylsiloxane/methylphenylsiloxane), xviii) dimethyl(heptyl-aldehyde)-siloxy-terminated poly(dimethylsiloxane/diphenylsiloxane), and xix) a combination of two or more of i) to xviii).

Alternatively, (E2) the aldehyde-functional polyorganosiloxane may be cyclic, e.g., when in unit formula (E2-1), subscripts a=b=c=e=f=g=h=0. The (E2-6) cyclic aldehyde-functional polydiorganosiloxane may have unit formula (E2-7): $(R^4R^{Ald}SiO_{2/2})_d$, where $R^{Ald}$, and $R^4$, and subscript d are as described above. Examples of cyclic aldehyde-functional polydiorganosiloxanes include 2,4,6-trimethyl-2,4,6-tri(propyl-aldehyde)-cyclotrisiloxane, 2,4,6,8-tetramethyl-2,4,6,8-tetra(propyl-aldehyde)-cyclotetrasiloxane, 2,4,6,8,10-pentamethyl-2,4,6,8,10-penta(propyl-aldehyde)-cyclopentasiloxane, and 2,4,6,8,10,12-hexamethyl-2,4,6,8,10,12-hexa(propyl-aldehyde)-cyclohexasiloxane.

Alternatively, (E2-6) the cyclic aldehyde-functional polydiorganosiloxane may have unit formula (E2-8): $(R^4_2SiO_{2/2})_c(R^4R^{Ald}SiO_{2/2})_d$, where $R^4$, $R^A$id, and subscripts c and d are as described above.

Alternatively, (E2) the aldehyde-functional polyorganosiloxane may be (E2-9) oligomeric, e.g., when in unit formula (E2-1) above the quantity (a+b+c+d+e+f+g)≤50, alternatively ≤40, alternatively ≤30, alternatively ≤25, alternatively ≤20, alternatively ≤10, alternatively ≤5, alternatively ≤4, alternatively ≤3. The oligomer may be cyclic, linear, branched, or a combination thereof. The cyclic oligomers are as described above as (E2-6).

Examples of linear aldehyde-functional polyorganosiloxane oligomers may have formula (E2-10):

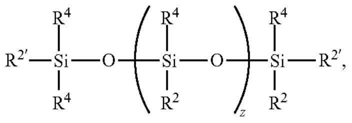

where $R^4$ and subscript z are as described above, each $R^{2'}$ is independently selected from the group consisting of $R^4$ and $R^A$id, with the proviso that at least one $R^{2'}$, per molecule, is $R^{Ald}$, where $R^{Ald}$ is as described above. Alternatively, when z=0 in formula (E2-10), the aldehyde-functional polyorganosiloxane oligomer may have formula:

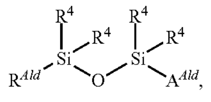

where $R^4$ and $R^{Ald}$ are as described above. Examples of linear aldehyde-functional polyorganosiloxane oligomers include 1,3-di(propyl-aldehyde)-1,1,3,3-tetramethyldisiloxane; 1,1,1,3,3-pentamethyl-3-(propyl-aldehyde)-disiloxane; and 1,1,1,3,5,5,5-heptamethyl-3-(propyl-aldehyde)-trisiloxane.

Alternatively, the aldehyde-functional polyorganosiloxane oligomer may be branched. The branched oligomer may have general formula (E2-11): $R^{Ald}SiR^{12}_3$, where $R^{Ald}$ is as described above and each $R^{12}$ is selected from $R^{13}$ and —$OSi(R^{14})_3$; where each $R^{13}$ is a monovalent hydrocarbon group; where each $R^{14}$ is selected from $R^{13}$, —$OSi(R^{15})_3$, and —$[OSiR^{13}_2]_{ii}OSiR^{13}_3$; where each $R^{15}$ is selected from $R^{13}$, —$OSi(R^{16})_3$, and —$[OSiR^{13}_2]_{ii}OSiR^{13}_3$; where each $R^{16}$ is selected from $R^{13}$ and —$[OSiR^{13}_2]_{ii}OSiR^{13}_3$; and where subscript ii has a value such that 0≤ii≤100. At least two of $R^{12}$ may be —$OSi(R^{14})_3$. Alternatively, all three of $R^{12}$ may be —$OSi(R^{14})_3$.

Alternatively, in formula (E2-11) when each $R^{12}$ is —$OSi(R^{14})_3$, each $R^{14}$ may be —$OSi(R^{15})_3$ moieties such that the branched polyorganosiloxane oligomer has the following structure:

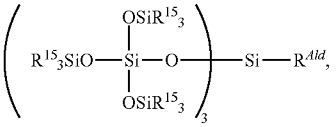

where $R^{Ald}$ and $R^{15}$ are as described above.

Alternatively, in formula (E2-11), when each $R^{12}$ is —$OSi(R^{14})_3$, one $R^{14}$ may be $R^{13}$ in each —$OSi(R^{14})_3$ such that each $R^{12}$ is —$OSiR^{13}(R^{14})_2$. Alternatively, two $R^{14}$ in —$OSiR^{13}(R^{14})$ may each be —$OSi(R^{15})_3$ moieties such that the branched aldehyde-functional polyorganosiloxane oligomer has the following structure:

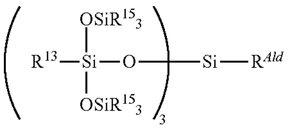

where $R^{Ald}$, $R^{13}$, and $R^{15}$ are as described above.

Alternatively, in formula (B2-11), one $R^{12}$ may be $R^{13}$, and two of $R^{12}$ may be —$OSi(R^{14})_3$. When two of $R^{12}$ are —$OSi(R^{14})_3$, and one $R^{14}$ is $R^{13}$ in each —$OSi(R^{14})_3$ then two of are —$OSiR^{13}(R^{14})_2$. Alternatively, each $R^{14}$ in —$OSiR^{13}(R^{14})_2$ may be —$OSi(R^5)_3$ such that the branched polyorganosiloxane oligomer has the following structure:

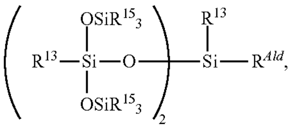

where $R^{Ald}$, $R^{13}$, and $R^{15}$ are as described above. Examples of aldehyde-functional branched polyorganosiloxane oligomers include 3-(3,3,3-trimethyl-1-λ$^2$-disiloxaneyl)propanal (which can also be named propyl-aldehyde-tris(trimethyl)siloxy)silane), which has formula:

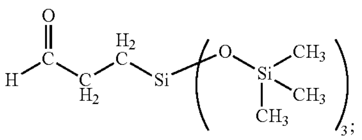

3-(1,3,5,5,5-pentamethyl-1λ$^3$,3λ$^3$-trisiloxaneyl)propanal (which can also be named methyl-(propyl-aldehyde)-di((1,1,1,3,5,5,5-heptamethyltrisiloxan-3-yl)oxy)-silane), which has formula

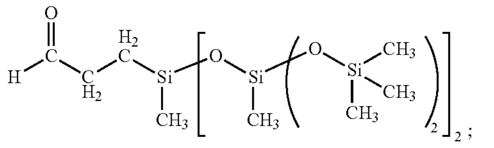

3-(3,5,5,5-tetramethyl-1λ²,3λ³-trisiloxaneyl)propanal (which can also be named (propyl-aldehyde)-tris((1,1,1,3,5,5,5-heptamethyltrisiloxan-3-yl)oxy)-silane), which has formula

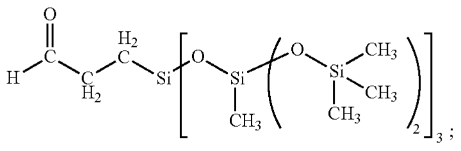

and 7-(3,5,5,5-tetramethyl-1λ²,3λ³-trisiloxaneyl)heptanal (which can also be named (heptyl-aldehyde)-tris((1,1,1,3,5,5,5-heptamethyltrisiloxan-3-yl)oxy)-silane), which has formula

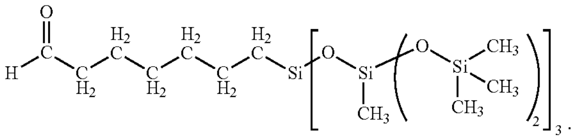

Alternatively, (E2) the aldehyde-functional polyorganosiloxane may be branched, such as the branched oligomer described above and/or a branched aldehyde-functional polyorganosiloxane that may have, e.g., more aldehyde groups per molecule and/or more polymer units than the branched oligomer described above (e.g., in formula (E2-1) when the quantity (a+b+c+d+e+f+g)>50). The branched aldehyde-functional polyorganosiloxane may have (in formula (E2-1)) a quantity (e+f+g) sufficient to provide >0 to 5 mol % of trifunctional and/or quadrifunctional units to the branched aldehyde-functional polyorganosiloxane.

For example, the branched aldehyde-functional polyorganosiloxane may comprise a Q branched polyorganosiloxane of unit formula (E2-13): $(R^4_3SiO_{1/2})_q(R^4_2R^{Ald}SiO_{1/2})_r(R^4_2SiO_{2/2})_s(SiO_{4/2})_t$, where $R^4$, $R^{Ald}$, and subscripts q, r, s, and t are as described above.

Alternatively, the branched aldehyde-functional polyorganosiloxane may comprise formula (E2-14): $[R^{Ald}R^4_2Si—(O—SiR^4_2)_x—O]_{(4-w)}—Si—[O—(R^4_2SiO)_vSiR^4_3]_w$, where $R^{Ald}$, $R^4$, and subscripts v, w, and x are as described above.

Alternatively, the branched aldehyde-functional polyorganosiloxane for starting material (E2-11) may comprise a T branched polyorganosiloxane (silsesquioxane) of unit formula (E2-15): $(R^4_3SiO_{1/2})_{aa}(R^{Ald}R^4_2SiO_{2/2})_{bb}(R^4_2SiO_{2/2})_{cc}(R^{Ald}R^4SiO_{2/2})_{ee}(R^4SiO_{3/2})_{dd}$, where $R^4$, $R^{Ald}$, and subscripts aa, bb, cc, dd, and ee are as described above.

Alternatively, (E2) the aldehyde-functional polyorganosiloxane may comprise an aldehyde-functional polyorganosiloxane resin, such as an aldehyde-functional polyorganosilicate resin and/or an aldehyde-functional silsesquioxane resin. The polyorganosilicate resin may comprise unit formula (E2-17): $(R^4_3SiO_{1/2})_{mm}(R^4_2R^{Ald}SiO_{1/2})_{nn}(SiO_{4/2})_{oo}(ZO_{1/2})_h$, where Z, $R^4$, $R^{Ald}$, and subscripts h, mm, nn, and oo are as described above.

Alternatively, (E2) the aldehyde-functional polyorganosiloxane may comprise (E2-18) an aldehyde-functional silsesquioxane resin, i.e., a resin containing trifunctional (T') units of unit formula: $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(ZO_{1/2})_h$; where $R^4$, $R^{Ald}$ and subscripts a, b, c, d, e, f, and h are as described above. Alternatively, the aldehyde-functional silsesquioxane resin may comprise unit formula (E2-19): $(R^4SiO_{3/2})_e(R^{Ald}SiO_{3/2})_f(ZO_{1/2})_h$, where $R^4$, $R^{Ald}$, Z, and subscripts h, e and f are as described above. Alternatively, the alkenyl-functional silsesquioxane resin may further comprise difunctional (D') units of formulae $(R^4_2SiO_{2/2})_c(R^4R^{Ald}SiO_{2/2})_d$ in addition to the T units described above, i.e., a D'T' resin, where $R^4$, $R^{Ald}$ and subscripts c and d are as described above. Alternatively, the alkenyl-functional silsesquioxane resin may further comprise monofunctional (M') units of formulae $(R^4_3SiO_{1/2})_a(R^4_2R^{Ald}SiO_{1/2})_b$, i.e., an M'D'T' resin, where $R^4$, $R^{Ald}$, and subscripts a and b are as described above for unit formula (B2-1).

EXAMPLES

These examples are provided to illustrate the invention to one of ordinary skill in the art and should not be construed to limit the scope of the invention set forth in the claims. Starting materials used herein are described in Table 1, below.

TABLE 1

| Starting Materials | | | |
|---|---|---|---|
| Type | Product Name | Chemical Class/Description | Source |
| Solvent 1 | Toluene | $C_7H_8$ | Fisher-Scientific |
| Solvent 2 | Hexane | $C_6H_{14}$ | Fisher Chemical |
| Substrate 1 | $MD^{Vi}M$ | 1,1,1,3,5,5,5 -heptamethyl-3-vinyltrisiloxane | Sigma-Aldrich |
| Substrate 2 | $^t$Bu-ethylene | Tert-butyl-ethylene | Sigma-Aldrich |
| Substrate 3a | $MeViSi(OMe)_2$ | Methyl,vinyldimethoxysilane | Sigma-Aldrich |
| Substrate 3b | $ViSi(OMe)_3$ | vinyltrimethoxysilane | Sigma-Aldrich |

TABLE 1-continued

| Starting Materials | | | |
|---|---|---|---|
| Type | Product Name | Chemical Class/Description | Source |
| Substrate 3c (same as 1) | $MD^{Vi}M$ | 1,1,1,3,5,5,5-heptamethyl-3-vinyltrisiloxane | Sigma-Aldrich |
| Substrate 3d | $ViSiMe_3$ | vinyltrimethylsilane | Sigma-Aldrich |
| Substrate 3e | $M^{Vi}M^{Vi}$ | 1,3-diviny1,1,3,3-ltetramethydisiloxane | Sigma-Aldrich |
| Substrate 3f | $D_4^{Vi}$ | 1,3,5,7-tetramethyl1,3,5,7-tetravinylcyclotetrasiloxane | Sigma-Aldrich |
| Substrate 4 | DOWSIL ™ SFD-119 Fluid, $M^{Vi}D_{178}M^{Vi}$ | Bis-dimethylvinylsiloxy-terminated polydimethylsiloxane homopolymer with Mn = 11,500 g/mol | Dow Silicones Corporation |
| Substrate 5 | DOWSIL ™ SFD-27 Fluid, $M^{Vi}D_{543}D_{147}{}^{Vi}M^{Vi}$ | Bis-dimethylvinylsiloxy-terminated poly(dimethyl/methylvinyl) siloxane copolymer with an average of 543 dimethylsiloxy (D) units and 147 methylvinylsiloxy ($D^{Vi}$) units per molecule | Dow Silicones Corporation |
| Substrate 6 | DOWSIL ™ 2-7063 Fluid, $M^{Vi}D_{141}D_2{}^{Vi}M^{Vi}$ | Bis-dimethylvinylsiloxy-terminated poly(dimethyl/methylvinyl) siloxane copolymer with an average of 141 dimethylsiloxy (D) units and 2 methylvinylsiloxy ($D^{Vi}$) units per molecule | Dow Silicones Corporation |
| Substrate 7 | DOWSIL ™ 6-3444, Resin of unit formula $(Me_3SiO_{1/2})_{40}(Me_2ViSiO_{1/2})_4(SiO_{4/2})_{56}$ | Methyl- and vinyl-functional polyorganosilicate resin with an average of 40 trimethylsiloxy (M) units, 4 dimethylvinylsiloxy ($M^{Vi}$) units and 56 tetrasiloxy units per molecule | Dow Silicones Corporation |
| Substrate 8 | DOWSIL ™ RMS-310, 63.7 wt. % solution of $(Me_2ViSiO_{1/2})_{25}(PhSiO_{3/2})_{75}$ in toluene | Silsesquioxane resin with methyl, vinyl, and phenyl groups with an average of 25 dimethylvinylsiloxy ($M^{Vi}$) units and 75 phenylsiloxy ($T^{Ph}$) units per molecule | Dow Silicones Corporation |
| Substrate 9 | 3,3 -dimethylbut-1-ene | 3,3 -dimethylbut-1-ene | |
| Substrate 10 | Si10Vi | 5-((1,1,1,3,5,5,5-heptamethyltrisiloxan-3-yl)oxy)-1,1,1,3,7,9,9,9-octamethyl-3,7-bis((trimethylsilyl)oxy)-5-vinylpentasiloxane | |
| Substrate 11 | $MD_{8.7}D_{3.7}{}^{Vi}M$ | Bis-trimethylsiloxy-terminated poly(dimethyl/methylvinyl) siloxane copolymer with an average of 8.7 dimethylsiloxy (D) units and 3.7 methylvinylsiloxy ($D^{Vi}$) units per molecule | Synthesized in Example 25 |
| Substrate 12 | $M^{Vi}D_7M^{Vi}$ | Bis-dimethylvinylsiloxy-terminated polydimethylsiloxane homopolymer with an average of 7 dimethylsiloxy (D) units per molecule | Dow Silicones Corporation |
| Substrate 13 | $M^{al}D_{102}M^{al}$ | Bis-allyldimethylsiloxy-terminated polydimethylsiloxane with an average of 102 dimethylsiloxy (D) units per molecule | Dow Silicones Corporation |

TABLE 1-continued

| Starting Materials | | | |
|---|---|---|---|
| Type | Product Name | Chemical Class/Description | Source |
| Substrate 14 | $(M^{hex}D_{35})_4Q$ | Branched polyorganosiloxane with one tetrafunctional (Q) unit per molecule, four dimethylhexenylsiloxy ($M^{hex}$) units per molecule and an average of 140 dimethylsiloxy (D) units per molecule, wherein up to 10% of the hexenyl groups were isomerized to have an internal double bond | Dow Silicones Corporation |
| Substrate 15 | $M_2^{Vi}D_{25}$ | Bis-dimethylvinylsiloxy-terminated polydimethylsiloxane with an average of 25 dimethylsiloxy (D) units per molecule | DSC |
| Substrate 16 | $M_2^{Vi}D_{77}$ | Bis-dimethylvinylsiloxy-terminated polydimethylsiloxane with an average of 77 dimethylsiloxy (D) units per molecule | DSC |
| Substrate 17 | $M_2^{Vi}D_{180}$ | Bis-dimethylvinylsiloxy-terminated polydimethylsiloxane with an average of 180 dimethylsiloxy (D) units per molecule | DSC |
| Substrate 18 | $M_2^{Vi}D_{329}$ | Bis-dimethylvinylsiloxy-terminated polydimethylsiloxane with an average of 329 dimethylsiloxy (D) units per molecule | DSC |
| Catalyst precursor | $Rh(acac)(CO)_2$ | $Rh(acac)(CO)_2$, where acac refers to acetylacetonyl | Strem |
| Ligand 1 | 6,6'-[[3,3',5,5'-tetrakis(1,1-dimethylethyl)-1,1'-biphenyl]-2,2'-diyl]bis(oxy)]bis-dibenzo[d,f][l,3,2]dioxaphosphepin | Close Ended Bisphosphite | A commercially available bisphosphite ligand prepared as described in U.S. Pat. No. 10,227,365 to Miller, et al. |
| Ligand 2 (Biphephos) | 6,6'-[(3,3'-Di-ter-butyl-5,5'-dimethoxy-1,1'-biphenyl-2,2'-diyl)bis(oxy)] bis (dibenzo [d,f] [1,3,2] dioxaphosphepin) | Close Ended Bisphosphite | Sigma-Aldrich |
| Ligand 3 | (9,9-dimethyl-9H-xanthene-4,5-diyl)bis(diphenylphosphane), Xantphos | Bisphosphine | TCI |
| Ligand 4 | tris(2,4-di-t-butylphenyl)phosphite | Triorganophosphite | Sigma-Aldrich |
| Ligand 5 (TPP) | Triphenylphospine | Triorganophosphine | Sigma-Aldrich |
| Ligand 6 | 2,2',6,6'-tetrakis((diphenylphosphaneyl)methyl)-1,1'-biphenyl | Tetraorganophosphine | Synthesized as described in WO2019/231610 (Ligand A) |
| Ligand 7 | tetra(naphthalen-1-yl)(3,3',5,5'-tetra-tert-butyl-6-6'-dimethyl-[1,1'-biphenyl]-2,2'-diyl) bis(phosphite) | Doubly Open Ended Bisphosphite | Synthesized as described in JP2016155065A and U.S. Pat. No. 5,910,600 |

Starting materials branded DOWSIL™ are available from Dow Silicones Corporation of Midland, MI, USA. Substrate 20, 5-((1,1,1,3,5,5,5-heptamethyltrisiloxan-3-yl)oxy)-1,1,1,3,7,9,9,9-octamethyl-3,7-bis((trimethylsilyl)oxy)-5-vinyl-pentasiloxane, has formula:

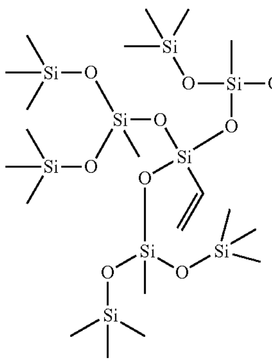

In Reference Examples 1-5, reaction conversion, selectivity, and regioselectivity (N/I ratio) were measured by $^1H$ NMR in $C_6D_6$, product structures and composition were additionally supported by $^{13}C$ NMR in $C_6D_6$. Reaction progress are monitored by the pressure drop in the intermediate pressure cylinder.

In this Reference Example 1, a comparison of various ligands for hydroformylation of alkenyl-functional organosilicon compounds and 3,3-dimethylbut-1-ene was performed. Samples were prepared as follows: In a nitrogen filled glovebox, $Rh(acac)(CO)_2$ (3.0 mg, 0.012 mmol), a Ligand in an amount shown in Table 2-1, below, and toluene (1.0 g, 0.011 mmol) were added into a 30 mL glass vial with a magnetic stir bar. The mixture was stirred on a stir plate until a homogeneous solution formed. The solution was transferred to an air-tight syringe with a metal valve and subsequently removed from the glove box. In a ventilated fume hood, a Substrate in an amount shown in Table 2-1, below and toluene (29.10 g, 0.3158 mmol) were loaded to a 100-mL Parr-reactor. The reactor was sealed and loaded into the holder. The reactor was pressurized with nitrogen up to 100 psi (689 kPa) via the dip-tube and was carefully relieved through a valve connected to the headspace three times. The reactor was then pressure tested by pressurizing to 300 psi (2,068 kPa) with nitrogen. After the pressure was released, the catalyst solution was added to the reactor via the sample loading port. The reactor was pressurized with syngas to 100 psi (689 kPa) and then released three times prior to being pressurized to 80 psi (552 kPa) via the dip-tube. Reaction temperature was set to 70° C. Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. N/I ratio was determined by $^1H$ NMR analysis of the final product.

Ligand comparative studies were performed with two different substrates, $MD^{Vi}M$ and $^{t}$Bu-ethylene. Of the ligands tested for the $MD^{Vi}M$ substrate, the bisphosphite ligands, i.e., Ligand 1 and Ligand 2, provided fastest reaction; samples reached 90% conversion after 21 minutes and 42 minutes, respectively, and afforded product with N/I ratios of 16 and 21, respectively. Surprisingly, bisphosphite ligands provided faster reaction than tris(2,4-di-t-butylphenyl)phosphite, which is a triorganophosphite. Without wishing to be bound by theory, it is thought that triorganophosphitesare usually faster for olefin hydroformylation compared to bisphosphites, and the comparative examples showed that $^{t}$Bu-ethylene as substrate, bisphosphite ligands were slower compared to tris(2,4-di-t-butylphenyl)phosphite These comparative studies demonstrated the unexpected benefit of superior reaction rate with the bisphosphite ligands in the hydroformylation of a vinyl functional organosilicon compound.

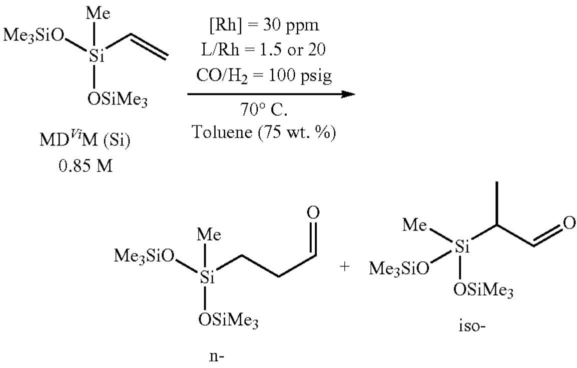

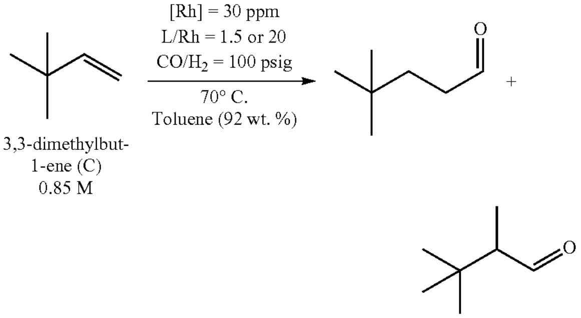

TABLE 2-1

| Sample | Ligand Selected | Ligand Amount (mg, mmol) | Substrate Selected | Substrate Amount (g, mmol) | Amount of Toluene added to Parr-rxr (g, mmol) |
|---|---|---|---|---|---|
| 1-1 | 1 | 14.3, 0.0170 | $MD^{Vi}M$ | 9.90, 40.0 | 29.10, 0.3158 |
| 1-2 | 1 | 14.3, 0.0170 | 3,3-dimethylbut-1-ene | 3.36, 40.0 | 35.64, 0.3784 |
| 1-3 | 2 | 13.7, 0.017 | $MD^{Vi}M$ | 9.90, 40.0 | 29.10, 0.3158 |
| 1-4 | 2 | 13.7, 0.017 | 3,3-dimethylbut-1-ene | 3.36, 40.0 | 35.64, 0.3784 |
| 1-5 | 3 | 10.1, 0.0174 | $MD^{Vi}M$ | 9.90, 40.0 | 29.10, 0.3158 |
| 1-6 | 3 | 10.1, 0.0174 | 3,3-dimethylbut-1-ene | 3.36, 40.0 | 35.64, 0.3784 |
| 1-7 | 4 | 149.9, 0.2317 | $MD^{Vi}M$ | 9.90, 40.0 | 29.10, 0.3158 |
| 1-8 | 4 | 149.9, 0.2317 | 3,3-dimethylbut-1-ene | 3.36, 40.0 | 35.64, 0.3784 |
| 1-9 | 5 | 60.8, 0.232 | $MD^{Vi}M$ | 9.90, 40.0 | 29.10, 0.3158 |

TABLE 2-1-continued

| Sample | Ligand Selected | Ligand Amount (mg, mmol) | Substrate Selected | Substrate Amount (g, mmol) | Amount of Toluene added to Parr-rxr (g, mmol) |
|---|---|---|---|---|---|
| 1-10 | 5 | 60.8, 0.232 | 3,3-dimethylbut-1-ene | 3.36, 40.0 | 35.64, 0.3784 |
| 1-11 | 6 | 16.5, 0.0174 | $MD^{Vi}M$ | 9.90, 40.0 | 29.10, 0.3158 |
| 1-12 | 6 | 16.5, 0.0174 | 3,3-dimethylbut-1-ene | 3.36, 40.0 | 35.64, 0.3784 |
| 1-13 | 7 | 18.6, 0.0174 | $MD^{Vi}M$ | 9.90, 40.0 | 29.10, 0.3158 |
| 1-14 | 7 | 18.6, 0.0174 | 3,3-dimethylbut-1-ene | 3.36, 40.0 | 35.64, 0.3784 |

TABLE 2-2

Catalyst comparison results for various ligands

| Ligand Class | Ligand | $T_{90\%}$, $MD^{Vi}M$ (minute) | N/I $MD^{Vi}M$ | $T_{90\%}$, tBu-Ethylene (minute) | N/I tBu-Ethylene |
|---|---|---|---|---|---|
| Bisphosphite | Ligand 1 | 21 | 16 | 163 | >200 |
| Bisphosphite | Ligand 2 Biphephos | 42 | 20 | 243 | >200 |
| Monophosphite | Ligand 4 tris(2,4-di-t-butylphenyl)phosphite (comparative) | 78 | 4 | 123 | 30 |
| Monophosphine | Ligand 5 TPP (comparative) | 200 | 2.3 | 180 | 20 |
| Bisphosphite | Ligand 7 (comparative) | 358 | 57 | 966 | >200 |
| Tetraphosphine | Ligand 6 (comparative) | 314 | 4.3 | N.D. | >200 |
| Bisphosphine | Ligand 3 Xantphos (comparative) | 500 | 15 | N.D. | >200 |

N.D. means not determined.

In this Reference Example 2, effect of Rh concentration was evaluated. Samples 2-1, 2-2, and 2-3 were prepared as follows: Example 2-1: In a nitrogen filled glovebox, $Rh(acac)(CO)_2$ (in an amount shown below in Table 3-1), Ligand 1 (in an amount shown below in Table 3-1) and toluene (1.0 g, 0.011 mmol) were added into a 30 mL glass vial with a magnetic stir bar. The mixture was stirred on a stir plate until a homogeneous solution formed. The solution was transferred to an air-tight syringe with a metal valve and subsequently removed from the glove box. In a ventilated fume hood, $MD^{Vi}M$ (9.90 g, 40.0 mmol) and toluene (29.10 g, 0.3158 mmol) were loaded to the Parr-reactor. The reactor was sealed and loaded into the holder. The reactor was pressurized with nitrogen up to 100 psi (689 kPa) via the dip-tube and was carefully relieved through a valve connected to the headspace three times. The reactor was then pressure tested by pressurizing to 300 psi (2086 kPa) with nitrogen. After the pressure was released, the catalyst solution was added to the reactor via the sample loading port. The reactor was pressurized with syngas to 100 psi (689 kPa) and then released three times prior to being pressurized to 80 psi (552 kPa) via the dip-tube. Reaction temperature was set to 70° C. Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. N/I ratio was determined by $^{1}H$ NMR analysis of the final product.

Samples 2-4 to 2-6, were prepared as follows: In a nitrogen filled glovebox, $Rh(acac)(CO)_2$ (18.0 mg, 0.0690 mmol), Ligand 1 (89.2 mg, 0.106 mmol) and toluene (30.25 g, 0.3289 mmol) were added into a 30 mL glass vial with a magnetic stir bar to make a stock solution. The mixture was stirred on a stir plate until a homogeneous solution formed. A portion of this solution (in an amount shown in Table 3-2, below 1.29 g) was transferred to an air-tight syringe with a metal valve and subsequently removed from the glove box. In a ventilated fume hood, $MD^{Vi}M$ (9.90 g, 40.0 mmol) and toluene (29.10 g, 0.3158 mmol) were loaded to the Parr-reactor. The reactor was sealed and loaded into the holder. The reactor was pressurized with nitrogen up to 100 psi (689 kPa) via the dip-tube and was carefully relieved through a valve connected to the headspace three times. The reactor was then pressure tested by pressurizing to 300 psi (2086 kPa) with nitrogen. After the pressure was released, the catalyst solution was added to the reactor via the sample loading port. The reactor was pressurized with syngas to 100 psi (689 kPa) and then released three times prior to being pressurized to 80 psi (552 kPa) via the dip-tube. Reaction temperature was set to 70° C. Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. N/I ratio was determined by $^{1}H$ NMR analysis of the final product.

The samples summarized below in Tables 3-1 to 3-3 show the effect of varying Rh concentration with Ligand 1/Rh as the catalyst. With as low as 1.6 ppm Rh concentration, full conversion was obtained with good yield and selectivity, as shown by high yield of the aldehyde and high ratio of linear to branched isomers (N/I) ratio. Without wishing to be bound by theory, it is thought that when low Rh loading (e.g., ≤30 ppm, alternatively ≤15 ppm, alternatively ≤5 ppm) is used, the Rh need not be removed from the aldehyde-functional organosilicon product before subsequent sale or use thereof because the aldehyde-functional organosilicon product will be stable and the process for its production will be cost effective. Rhodium concentration, reaction time, regioselectivity, yield, and conversion are shown below in Table 3-1, 3-2, and 3-3.

TABLE 3-1

Preparation of Samples 2-1, 2-2, and 2-3

| Sample | Amount of $Rh(acac)(CO)_2$ (mg, mmol) | Ligand Selected | Ligand Amount (mg, mmol) | Substrate Selected | Substrate Amount (g, mmol) | Amount of Toluene added to Parr-rxr (g, mmol) |
|---|---|---|---|---|---|---|
| 2-1 | 6.0, 0.023 | Ligand 1 | 29.4, 0.035 | MD$^{Vi}$M | 9.90, 40.0 | 29.10, 0.3158 |
| 2-2 | 3.0, 0.012 | Ligand 1 | 14.7, 0.018 | MD$^{Vi}$M | 9.90, 40.0 | 29.10, 0.3158 |
| 2-3 | 1.5, 0.0060 | Ligand 1 | 7.3, 0.009 | MD$^{Vi}$M | 9.90, 40.0 | 29.10, 0.3158 |

TABLE 3-2

Preparation of Samples 2-4, 2-5, and 2-6

| Sample | Amount of $Rh(acac)(CO)_2$ (mg, mmol) | Ligand Selected | Ligand Amount (mg, mmol) | Toluene Amount in Stock Solution (mg, mmol) | Amount of Stock Solution Added to Parr-rxr (g) | Substrate Selected | Substrate Amount (g, mmol) | Amount of Toluene added to Parr-rxr (g, mmol) |
|---|---|---|---|---|---|---|---|---|
| 2-4 | 18.0, 0.690 | Ligand 1 | 89.2, 0.016 | 30.25, 0.3289 | 1.29 | MD$^{Vi}$M | 9.90, 40.0 | 29.10, 0.3158 |
| 2-5 | 18.0, 0.690 | Ligand 1 | 89.2, 0.016 | 30.25, 0.3289 | 0.68 | MD$^{Vi}$M | 9.90, 40.0 | 29.10, 0.3158 |
| 2-6 | 18.0, 0.690 | Ligand 1 | 89.2, 0.016 | 30.25, 0.3289 | 0.28 | MD$^{Vi}$M | 9.90, 40.0 | 29.10, 0.3158 |

TABLE 3-3

Impact of catalyst concentration

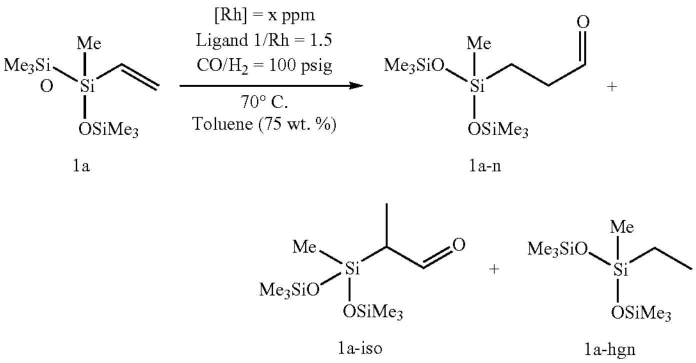

1a, 1a-n, 1a-iso, 1a-hgn

| Sample No. | Rh Cone. (PPm) | Rxn Time (min) | N/I | Yield of aldehyde (%) | Yield of 1a-hgn (%) | 1a Conv. (%) |
|---|---|---|---|---|---|---|
| 2-1 | 60 | <20 | 13.6 | >99 | 1.5 | >99 |
| 2-2 | 30 | 40 | 15.9 | 97.2 | 1.4 | >99 |
| 2-3 | 15 | 100 | 15.3 | >99 | 1.5 | >99 |
| 2-4 | 8 | 140 | 15.6 | 97.9 | 1.6 | >99 |
| 2-5 | 4 | 240 | 14.3 | 98.4 | 1.5 | >99 |
| 2-6 | 1.6 | 540 | 14.0 | 97.9 | 1.4 | >99 |

In this Reference Example 3, samples were prepared according to the following general procedure, varying the substrate and amount of Ligand 1. Selections of starting materials and their amounts are as shown in Table 4-1. In a nitrogen filled glovebox, $Rh(acac)(CO)_2$ (22.0 mg, 0.849 mmol), Ligand 1 (in an amount shown in Table 4-1, below) and toluene (5.0 g, 0.054 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, vinyltrimethoxysilane 3b (44.9 g, 303 mmol) and toluene (in an amount shown in Table 4-1, below) were loaded to a 300-mL Parr-reactor. The reactor was sealed and loaded into the holder. The reactor was pressurized with nitrogen up to 100 psi (689 kPa) via the dip-tube and was carefully relieved through a valve connected to the headspace three times. The reactor was then pressure tested by pressurizing to 300 psi (2086 kPa) with nitrogen. After the pressure was released, the catalyst solution was added to the reactor via the sample loading port. The reactor was pressurized with syngas to 100 psi (689 kPa) and then released three times prior to being pressurized to 80 psi (552 kPa) via the dip-tube. Reaction temperature was set to 90° C. Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. N/I ratio was determined by $^{1}H$ NMR analysis of the final product. Starting materials used are shown below in Table 4-1.

The samples summarized below in Tables 4-1 and 4-2 show that a range of substrates that can be hydroformylated using a bisphosphite ligand of the formula described herein (e.g., Ligand 1) under the conditions described herein. Vinyl-functional silanes (having 1 silicon atom per molecule) and vinyl-functional oligomeric siloxanes (e.g., with 1 to 3) siloxy units per molecule could be hydroformylated to form aldehyde-functional silanes and aldehyde-functional siloxane oligomers under the reaction conditions tested, all affording excellent yield of the desired aldehyde-functional organosilicon compound.

TABLE 4

Substrate Scope

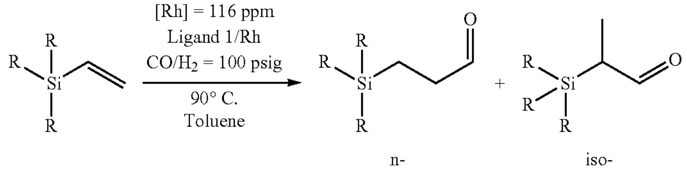

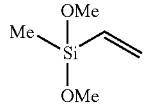
3a

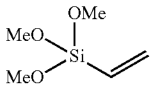
3b

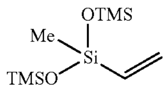
3c

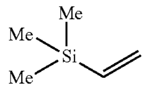
3d

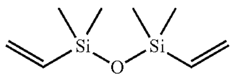
3e

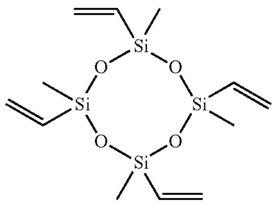 [SMILES: C=C[Si]1(C)O[Si](C)(C=C)O[Si](C)(C=C)O[Si](C)(C=C)O1]
3f

TABLE 4-1

| Starting Materials | | | | | | |
|---|---|---|---|---|---|---|
| Sample | 3-1 | 3-2 | 3-3 | 3-4 | 3-5 | 3-6 |
| Rh(acac)$CO_2$ Amount (mg, mmol) | 22.0, 0.0849 | 6.7, 0.026 | 33.7, 0.13 | 26.4, 0.1019 | 18.1, 0.0699 | 5.9, 0.019 |
| Ligand Selected | Ligand 1 | Ligand 1 | Ligand 1 | Ligand 1 | Ligand 1 | Ligand 1 |
| Ligand Amount (mg, mmol) | 106.8, 0.1272 | 30.2, 0.0360 | 171.4, 0.2043 | 128.0, 0.1525 | 88.0, 0.105 | 28.6, 0.0341 |
| Substrate Selected | 3b | 3c | 3d | 3a | 3e | 3f |
| Substrate Amount (g, mmol) | 44.9, 303 | 20.2, 81.2 | 44.8, 0.448 | 44.8, 339 | 44.8, 240 | 45.0, 130 |
| Amount of Toluene added to Parr-rxr (g, mmol) | 40.0, 488 | 57.7, 627 | 39.7 430 | 40.0, 488 | 40.0, 488 | 40.0, 488 |

TABLE 4-2

| Results | | | | | | |
|---|---|---|---|---|---|---|
| Sample | Substrate | Rh Conc. (ppm) | Cat. Load. (mol %) | Sub. Conc. (wt. %) | N/I | Yield (%) |
| 3-1 | 3b | 97 | 0.03 | 50 | 6.5 | 99.4 |
| 3-2 | 3c | 32 | 0.03 | 25 | 7.9 | 99.6 |
| 3-3 | 3d | 144 | 0.03 | 50 | 12.8 | >99 |
| 3-4 | 3a | 116 | 0.03 | 50 | 9.5 | 93 |
| 3-5 | 3e | 80 | 0.03 | 50 | 15.0 | >98 |
| 3-6 | 3f | 26 | 0.03 | 25 | N.D. | >98 |

In this Reference Example 4, effect of temperature on hydroformylation was studied. Samples 4-1 to 4-4 were prepared as follows: In a nitrogen filled glovebox, Rh(acac)$(CO)_2$ (18.0 mg, 0.0690 mmol), Ligand 1 (89.2 mg, 0.106 mmol) and toluene (30.25 g, 0.3289 mmol) were added into a 30 mL glass vial with a magnetic stir bar to make a stock solution. The mixture was stirred on a stir plate until a homogeneous solution formed. A portion of this solution (1.29 g) was transferred to an air-tight syringe with a metal valve and subsequently removed from the glove box. In a ventilated fume hood, MD$^{Vi}$M (9.90 g, 40.0 mmol) and the toluene (29.10 g, 0.3158 mmol) were loaded to the Parr-reactor. The reactor was sealed and loaded into the holder. The reactor was pressurized with nitrogen up to 100 psi (689 kPa) via the dip-tube and was carefully relieved through a valve connected to the headspace three times. The reactor was then pressure tested by pressurizing to 300 psi (2086 kPa) with nitrogen. After the pressure was released, the catalyst solution was added to the reactor via the sample loading port. The reactor was pressurized with syngas to 100 psi (689 kPa) and then released for three times prior to being pressurized 80 psi (552 kPa) via the dip-tube. Reaction temperature was set to the desired temperature (shown below in Table 5). Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. N/I ratio was determined by $^1H$ NMR analysis of the final product.

The samples described below in Table 5 below showed that increasing reaction temperature resulted in increasing reaction rate. Surprisingly, the inventors found that increasing reaction temperature increased the selectivity to linear isomer (i.e., increased the N/I) ratio at reaction temperatures ≤90° C. Without wishing to be bound by theory, it is thought that further increasing reaction temperature to >110° C. may decrease N/I ratio when hydroformylating alkenyl-functional silanes and alkenyl-functional siloxane oligomers under the conditions tested in this example. Temperatures, reaction times, selectivity, yield and conversion of the samples are shown below in Table 5.

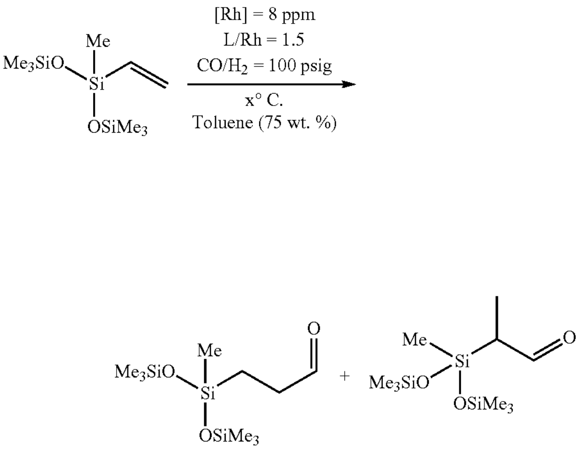

TABLE 5

| Temperature Study | | | | | |
|---|---|---|---|---|---|
| Sample No. | Temp. (° C.) | Rxn Time (min) | N/I | Yield of aldehyde (%) | Conv. (%) |
| 4-1 | 50 | 1200 | 9.6 | >99 | >99 |
| 4-2 | 70 | 100 | 15.3 | >97 | >99 |
| 4-3 | 90 | 60 | 18.7 | >99 | >99 |
| 4-4 | 110 | 39 | 11.8 | >99 | >99 |

In this Reference Example 5, a comparison of Ligands 1 and 4 was conducted. Samples were prepared as follows: In a nitrogen filled glovebox, Rh(acac)$(CO)_2$ (in an amount shown below in Table 6-1), Ligand 1 or Ligand 4 (in an amount shown below in Table 6-1) and toluene (5.0 g, 0.054 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, dimethoxymethylvinylsilane 3a (44.8 g, 339 mmol) and toluene (40.0 g, 488 mmol) were loaded to a 300-mL Parr-reactor. The reactor was sealed and loaded into the holder. The reactor was pressurized with nitrogen up to 100 psi (689 kPa) via the dip-tube and was carefully relieved through a valve connected to the headspace three times. The reactor was then pressure tested by pressurizing to 300 psi (2086 kPa) with nitrogen. After the pressure was released, the catalyst solution was added to the reactor via the sample loading port. The reactor was pressurized with syngas to 100 psi (689 kPa) and then released three times prior to being pressurized to 80 psi (552 kPa) via the dip-tube. Reaction temperature was set to 90° C. Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. N/I ratio was determined by $^1H$ NMR analysis of the final product.

TABLE 6-1

| Preparation of Samples 5-1 and 5-2 | | | | | | | | |
|---|---|---|---|---|---|---|---|---|
| Sample | Amount of $Rh(acac)(CO)_2$ (mg, mmol) | Ligand Selected | Ligand Amount (mg, mmol) | Toluene Amount in Stock Solution (g, mmol) | Substrate Selected | Substrate Amount (g, mmol) | Amount of Toluene added to Parr-rxr (g, mmol) |
| 5-1 | 26.4, 0.102 | Ligand 1 | 128.0, 0.1525 | 5.0, 0.054 | 3a | 44.8, 339 | 40.0, 488 |
| 5-2 | 25.7, 0.0991 | Ligand 4 | 1.2826, 1.9825 | 5.0, 0.054 | 3a | 44.8, 339 | 40.0, 488 |

Table 6-2 below shows that using methylvinyldimethoxysilane as the substrate and Ligand 4, tris(2,4-di-t-butylphenyl)phosphite, as the ligand in the catalyst afforded a hydroformylation product with low linear selectivity (low N/I ratio) and low yield of aldehyde-functional methyldimethoxysilane. Without wishing to be bound by theory, it is thought that this was mainly due to the decomposition of the branched aldehyde to Brook rearrangement (BR) product. However, with Ligand 1 as the ligand in the catalyst, high yield of aldehyde was obtained.

TABLE 6-2

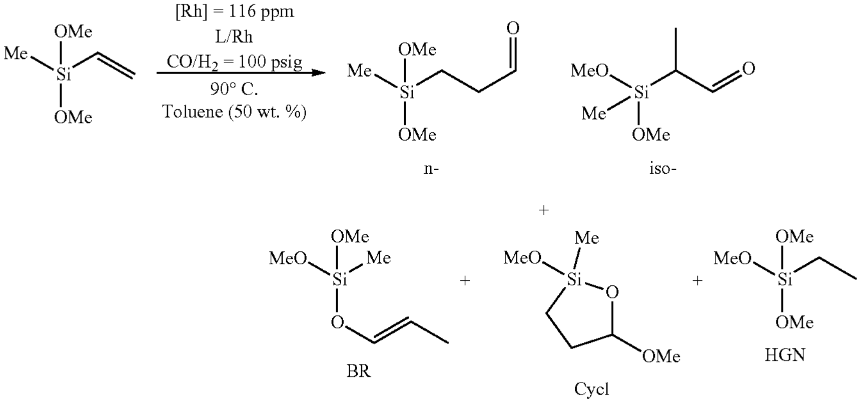

n- iso-

+

BR

+

Cycl

+

HGN

| Sample No. | Ligand | Rxn time (min) | L/Rh | N/I | yield of aldehydes | yield BR | Yield Cycl. |
|---|---|---|---|---|---|---|---|
| 5-1 | Ligand 1 | 73 | 1.5 | 9.5 | 95% | 2% | 3% |
| 5-2 (comparative) | Ligand 4, tris(2,4-di-t-butylphenyl) phosphite | 533 | 20 | 9.5 | 66% | 18% | 9% |

In the following Examples 6-19, reaction conversion, selectivity, and regioselectivity (N/I ratio) were measured by $^1H$ NMR in $C_6D_6$, product structures and composition were additionally supported by $^{13}C$ NMR in $C_6D_6$. Product molecular weights such as Mn and Mw along with PDI were determined by GPC.

The reaction mixtures were analyzed by $^1H$ and $^{13}C$ NMR and by GPC. Hydroformylation in a solvent comprised a catalyst activation procedure prior to hydroformylation, while neat substrate hydroformylation involved either catalyst activation during the initial reaction period or catalyst pre-activation in toluene prior to hydroformylation, followed by the transfer of the activated catalyst to the starting polyvinylsiloxane. In addition to linear aldehydes as the major products shown in FIG. 1, hydroformylation generated several by-products, which were detected and analyzed by NMR:

A. Branched aldehydes that determine the reaction regioselectivity (N/I is a molar ratio of the normal to branched aldehyde):

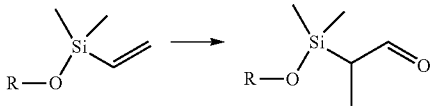

B. The Brook rearrangement byproduct that forms from the branched aldehyde at elevated temperature:

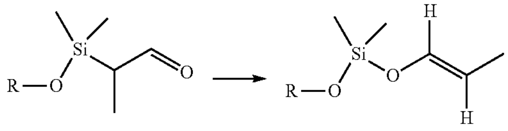

C. The olefin hydrogenation byproduct that unproductively consumes the olefin:

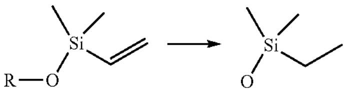

In this Example 6, neat DOWSIL™ SFD-119 Fluid (25 g; Mw 15,000; d=1.02) was purged with nitrogen and quickly introduced into a 150 mL Parr reactor under nitrogen blanket. The reactor was sealed and purged 3 times with syngas.

$Rh(CO)_2acac$ (25.8 mg; 0.1 mmol) and Ligand 1 (167.8 mg; 0.2 mmol) were dissolved in nitrogen purged toluene (200 g; 230.7 mL) in the nitrogen box. Then the Rh/Ligand 1 catalyst stock solution in toluene (0.125 g; 0.15 mL) was charged by syringe through the septum to the sealed Parr reactor. The temperature was raised to 90° C. with slow stirring under initial syngas pressure of 20-50 psi (137 kPa to 345 kPa). Then the syngas pressure was adjusted to 100 psig (689 kPa) and stirring to 400 RPM. In 2 hours the DOWSIL™ SFD-119 Fluid conversion reached 91% with N/I=14 and in 4 h 97.4% with N/I=17. The product is labelled HF-SFD-119 in Table 7, below.

TABLE 7

Average Mw values were determined by GPC in toluene:

| Compound | Mn | Mw | PDI |
|---|---|---|---|
| DOWSIL ™SFD-119 Fluid | 11690 | 23953 | 2.05 |
| HF-SFD-119 | 11225 | 23667 | 2.11 |

In this Example 7, $Rh(CO)_2acac$ (25.8 mg; 0.1 mmol) and Ligand 1 (167.8 mg; 0.2 mmol; Mw=838.94) were dissolved in nitrogen purged toluene (200 g; 230.7 mL) with stirring. A portion of this solution (1 g; 1.15 mL) was charged by syringe to a 3-time syngas purged 150 mL reactor containing 19 g (21.95 mL) toluene so that the formed diluted solution would be 20 g. Then 60 psi (414 kPa) of syngas was charged to the reactor, and the solution was heated at 70° C. for 30 min. The reactor was cooled to 30-40° C., pressure released, and DOWSIL™ SFD-119 Fluid solution (15 g; 1 mmol; Mw 15,000; d=1.02) in toluene (15 g; 17.3 mL) was introduced by syringe. Syngas (60 psi/414 kPa) was charged, the temperature was brought to 90° C., and pressure was adjusted to 100 psi and kept at this level. The mixture was analyzed by NMR in 2 h and 4 h. In 2 hours the DOWSIL™ SFD-119 Fluid conversion to HF-SFD-119 reached 88% with N/I=18 and in 4 h 98% with N/B=18.

In this Reference Example 8, Samples 8-1 to 8-8 were prepared using similar procedures to those of Examples 6 and 7; several vinyl-functional polymethylsiloxanes were hydroformylated with different Rh/ligand catalysts under various operating conditions to produce a mixture of a normal aldehyde-functional siloxane with a moiety: $—SiCH_2CH_2CHO$ and a branched aldehyde-functional siloxane with a moiety: $—SiCH(CH_3)CHO$. The reaction outcomes are shown in Table 8.

TABLE 8

Samples with SFD-119 at 100 psig (689 kPa) of syngas.

| Sample | Rh, ppm | Ligand (L/Rh ratio) | Solvent | Temp ° C. | Time (h) | Conv % | N/I | Brook, % | Hydro, % |
|---|---|---|---|---|---|---|---|---|---|
| 8-1 | 0.25 | Ligand 1 (2) | Neat* | 90 | 2 | 91 | 14 | N/D | N/D |
| | | | | | 4 | 97 | 17 | 2.0 | 3.9 |
| 8-2 | 1 | Ligand 1 (2) | Toluene | 90 | 2 | 88 | 18 | N/D | N/D |
| | | | | | 4 | 98 | 18 | BDL* | 1.8 |
| 8-3 | 0.5 | Ligand 1 (2) | Neat* | 90 | 2 | 100 | 15 | 1.1 | 4.1 |
| 8-4 | 5 | Ligand 1 (2) | Toluene | 70 | 2 | 100 | 39 | BDL* | BDL* |
| 8-5 | 0.5 | Ligand 2 Biphephos (2) | Neat* | 90 | 4 | 100 | 29 | 1.2 | 4.3 |
| 8-6 | 1 | Ligand 2 Biphephos (2) | Neat* | 90 | 2 | 100 | 22 | 0.8 | 5.7 |
| 8-7 | 1 | Ligand 2 Biphephos (2) | Toluene | 90 | 4 | 100 | 42 | BDL* | BDL* |
| 8-8 (comp) | 10 | Ligand 4 tris(2,4-di-t-butyl-phenyl)phosphite (40) | Toluene | 90 | 4 | 99 | 2.5 | 11.7 | 5.6 |
| 8-9 | 10 | Ligand 3 | Toluene | 90 | 1 | 97 | 8 | N/D | N/D |
| (comp) | | Xantphos (2) | | | 2 | 100 | 9 | 1.5 | 1.0 |
| 8-10 | 5 | Ligand 5 | Toluene | 90 | 1 | 96 | 2.5 | N/D | N/D |
| (comp) | | TPP (20) | | | 2 | 100 | 2.6 | 10.2 | 2.0 |

In Table 8 above, Brook % and Hydro % are selectivities to the Brook rearrangement byproducts and olefin hydrogenation byproducts, respectively, the balance is the aldehyde selectivity. BDL means below detection limit; N/D means not determined; comp means comparative experiment; and * means the catalyst was introduced in a minimal amount of toluene, see Example 6 description.

The working and comparative examples in Table 8 showed that high conversion, good selectivity (N/I ratio >10), with minimal Brook rearrangement and minimal olefin hydrogenation were achieved with both Ligands 1 and 2 under varying conditions of reaction time and temperature regardless of whether toluene solvent was present. Without wishing to be bound by theory, it is thought that the present process is robust and provides favorable hydroformylation reaction under varying conditions.

In this Example 9, $Rh(CO)_2acac$ (25.8 mg; 0.1 mmol) and Ligand 1 (167.8 mg; 0.2 mmol) were dissolved in nitrogen purged toluene (200 g; 230.7 mL) with stirring in the purge box. This solution (25 mL) was transferred by syringe in syngas purged reactor #1. Syngas (50 psi, 345 kPa) was added and the mixture was heated to 70° C. for 30 min, syngas pressure adjusted to 100 psig (689 kPa) when the mixture temperature reached 70° C. After 30 min the reaction mixture was cooled to 30° C. and syngas was vented prior to transferring the activated catalyst into reactor #2 (see below).

Neat DOWSIL™ 2-7063 INT (50 g; 5 mmol; Mw=10,800; d=0.97) was purged with nitrogen and quickly introduced into a 150 mL open reactor #2 under nitrogen blanket. The reactor was sealed and purged 3 times with syngas. Then the activated Rh/Ligand 1 catalyst stock solution in toluene (1.00 g; 1.20 mL) from reactor #1 was charged to reactor #2 by syringe. The temperature was gradually raised to 70° C. with slow stirring under initial syngas pressure of 50 psi (345 kPa). Then the syngas pressure was adjusted to 100 psig (689 kPa) and stirring to 400 RPM. The reaction was carried out at 70° C. and 100 psig (689 kPa) of syngas and was monitored by NMR. In 5 h the conversion reached 99% with N/I=13 (Table 2).

This Example 10 repeated the conditions of Example 7, except using DOWSIL™ 2-7063 INT in place of DOWSIL™ SFD-119 Fluid.

In this Example 11, $Rh(CO)_2acac$ (25.8 mg; 0.1 mmol) and Ligand 1 (167.8 mg; 0.2 mmol; Mw=838.94) were dissolved in nitrogen purged hexane (200 g; 305.3 mL) with stirring. A solution of DOWSIL™ SFD-27 Fluid (38 g; 1 mol equivalent per one C═C double bond; Mw equiv. 380.9) in hexane (34 g; 51.9 mL) was prepared, purged by nitrogen and introduced into a 3 time syngas purged 150 mL Parr reactor by syringe. The catalyst solution (8 g; 12.2 mL; 0.004 mmol Rh, 0.008 mmol L) was charged by syringe to the reactor. Syngas (60 psi, 414 kPa) was charged, the temperature was brought to 80° C. and pressure was adjusted to 100 psi (689 kPa) and kept at this level. The mixture was monitored by NMR. The reaction was completed in 5 h, 100% conversion (Table 9).

These Examples 12 and 13 in Table 9 were performed using a similar procedure as in Example 11.

TABLE 9

Examples of this invention with other starting vinyl polysiloxanes at 100 psig (689 kPa) of syngas using Ligand 1/Rh 2:1 molar ratio.

| Example | Vinyl polysiloxane | Rh, ppm | Solvent | Temp ° C. | Time, h | Conversion, % | N/I |
|---|---|---|---|---|---|---|---|
| 9 | 2-7063 INT | 1 | Neat | 70 | 5 | 99 | 13 |
| 10 | 2-7063 INT | 2 | Toluene | 90 | 8 | 97 | 26 |
| 11 | SFD-27 | 5 | Hexane | 80 | 2 | 100 | — |
| 12 | SFD-27 | 2 | Hexane | 80 | 6 | 98 | — |
| 13 | SFD-27 | 10 | Hexane | 70 | 2 | 100 | — |

In this Example 14, no catalyst pre-activation was performed. $Rh(CO)_2acac$ (25.8 mg; 0.1 mmol) and Ligand 1 (167.8 mg; 0.2 mmol) were dissolved in nitrogen purged toluene (200 g; 230.7 mL) with stirring. Neat DOWSIL™ SFD-119 Fluid (25 g; 1.67 mmol; d=1.02) was purged with nitrogen and quickly introduced into a 150 mL open reactor under nitrogen blanket. The reactor was sealed and purged 3 times with syngas. Then the Rh/Ligand 1 catalyst stock solution in toluene (0.25 g; 0.30 mL) was charged by syringe to this reactor. The temperature was gradually raised to 90° C. with slow stirring under initial syngas pressure of 15 psi (103 kPa). Then the syngas pressure was adjusted to −25 psig (172 kPa) and stirring to ~400 RPM. The reaction was monitored by NMR. In 6 h the conversion reached 97% and reaction regioselectivity and byproducts were determined (Table 10).

This Example 15 was carried out in a similar fashion to Example 14, above, but using $CO/H_2$ 1:2 in place of 1:1 and the temperature 80° C. in place of 90° C. (Table 10). An increased proportion of the hydrogenation by-product was observed.

In this Example 16, the catalyst was pre-activated. $Rh(CO)_2acac$ (25.8 mg; 0.1 mmol) and Ligand 1 (167.8 mg; 0.2 mmol) were dissolved in nitrogen purged toluene (200 g; 230.7 mL) with stirring in the purge box. This solution (~20 mL) was transferred by syringe in syngas purged reactor #1. Syngas (50 psi, 345 kPa) was added and the mixture was heated to 70° C. for 30 min, syngas adjusted to 100 psig (689 kPa) when the mixture reached 70° C. After 30 min, the reaction mixture was cooled to 30° C. or lower and syngas was vented prior to transferring the activated catalyst into reactor #2.

Neat DOWSIL™ SFD-119 Fluid (25 g; 1.67 mmol; d=1.02) was purged with nitrogen and quickly introduced into a 150 mL open reactor #2 under nitrogen blanket. The reactor was sealed and purged 3 times with syngas. Then the activated Rh/Ligand 1 catalyst stock solution in toluene (0.25 g; 0.30 mL) from reactor #1 was charged to reactor #2 by syringe. The temperature was gradually raised to 90° C. with slow stirring under initial syngas pressure of −15 psi. Then the syngas pressure was adjusted to 25 psig and stirring to −400 rpm.

The reaction was carried out at 90° C. and 25 psig (172 kPa) of syngas for 2 h, and then the reaction mixture was analyzed by NMR. The reaction continued, and the mixture was additionally analyzed at 4 h. The reaction regioselectivity and byproducts were determined (Table 10).

These Examples 17-19 were carried out similarly to Example 16 except using different reaction temperatures, reaction times and/or Rh concentrations. Conditions and results are shown in Table 10.

Table 10. Examples of this invention with DOWSIL™ SFD-119 Fluid at 25 psig (172 kPa) of syngas using Ligand 1/Rh 2:1 molar ratio without a solvent. Brook % and Hydro % are selectivities to the Brook rearrangement by-products and olefin hydrogenation byproducts, respectively, the balance is the aldehyde selectivity.

TABLE 10

| Example | Rh, ppm | CO/H ratio | Temp ° C. | Time, h | Conv % | N/I | Aldehyde, select % | Hydro, % | Brook, % | Catalyst pre-activated |
|---|---|---|---|---|---|---|---|---|---|---|
| 14 | 0.5 | 1:1 | 90 | 6 | 97 | 10.8 | 84.0 | 9.8 | 6.1 | No |
| 15 | 0.5 | 1:2 | 80 | 2 | 100 | 11.4 | 85.3 | 14.7 | — | No |
| 16 | 0.5 | 1:1 | 90 | 2 | 99.2 | 7.9 | 89.0 | 8.9 | 2.1 | Yes |
| | | | | 4 | 100 | 10.4 | 86.0 | 9.7 | 4.3 | |
| 17 | 0.5 | 1:1 | 80 | 2 | 99.1 | 9.5 | 93.2 | 6.4 | 0.4 | Yes |
| 18 | 0.5 | 1:1 | 70 | 2 | 92.9 | 14.7 | 97.8 | 2.2 | 0 | Yes |
| | | | | 4 | 99.1 | 14.8 | 98.9 | 3.1 | 0 | |
| | | | | 6 | 99.6 | 15.2 | 97.6 | 2.4 | <0.1 | |
| 19 | 1 | 1:1 | 70 | 2 | 100 | 11.0 | 94.5 | 5.5 | 0 | Yes |

In Examples 14-15, the catalyst was not pre-activated. In Examples 16-19, the catalyst was preactivated.

In the following Examples 20-21, the reaction conversion, selectivity, and regioselectivity (N/I) were measured by $^1H$ NMR in $C_6D_6$, product structures and composition were additionally supported by $^{13}C$ NMR in $C_6D_6$. Reaction progress was monitored by the pressure drop in the intermediate pressure cylinder.

In this Example 20, hydroformylation of vinyl-functional MQ resin (DOWSIL™ 6-3444 resin) was performed, as follows: In a nitrogen filled glovebox, $Rh(acac)(CO)_2$ (0.0026 g), Ligand 1 (0.0154 g) and heptane (26.32 g) were added into a 30 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, DOWSIL™ 6-3444 (135.2 g) and heptane (8.76 g) were loaded to the Parr-reactor. The reactor was sealed and pressurized with nitrogen up to 100 psig (689 kPa) via the dip-tube and was carefully relieved through a valve connected to the head-space. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 90° C. Heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of vinyl groups was observed after 10 hours reaction time as monitored by $^{1}H$ NMR and $^{29}Si$ NMR.

In this Example 21, a T-resin (DOWSIL™ RMS-310) was hydroformylated, as follows: In a nitrogen filled glovebox, $Rh(acac)(CO)_2$ (0.00252 g), Ligand 1 (0.01368 g) and toluene (3.65 g) were added into a 30 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, DOWSIL™ RMS-310, (135.2 g) and toluene (48.04 g) were loaded to the Parr-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure test was subsequently performed by pressurizing the reactor with nitrogen to up to 300 psig (2068 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 90° C.

The heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of alkene was observed 100 minutes reaction time as monitored by $^{1}H$ NMR and $^{29}Si$ NMR.

In this Example 22, hydroformylation of a silazane was performed as follows:

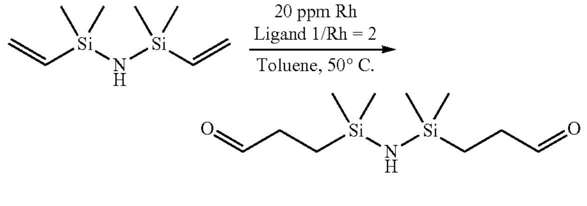

In a nitrogen filled glovebox, $Rh(acac)(CO)_2$ (10.1 mg, 0.0390 mmol), Ligand 1 (65.2 mg, 0.0777 mmol) and toluene (5.0 g, 0.054 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, bis(dimethyl(vinyl)silyl)amine (50.0 g, 270 mmol) and toluene (145.0 g, 1576 mmol) were loaded to a 300-mL Parr-reactor. The reactor was sealed and loaded into the holder. The reactor was pressurized with nitrogen up to 100 psi (689 kPa) via the dip-tube and was carefully relieved through a valve connected to the headspace for three times. The reactor was then pressure tested by pressurizing to 300 psi (2068 kPa) with nitrogen. After the pressure was released, the catalyst solution was added to the reactor via the sample loading port. The reactor was pressurized with syngas to 100 psi (689 kPa) and then released for three times prior to being pressurized 80 psi (552 kPa) via the dip-tube. Reaction temperature was set to 50° C. Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. Once the gas consumption curve reached a plateau, heating was stopped. The generated material was carefully transferred out of the reactor and stored in the freezer. N/I ratio was determined by $^{1}H$ NMR analysis of the final product.

In this Example 23, hydroformylation of a branched oligomer was performed as follows:

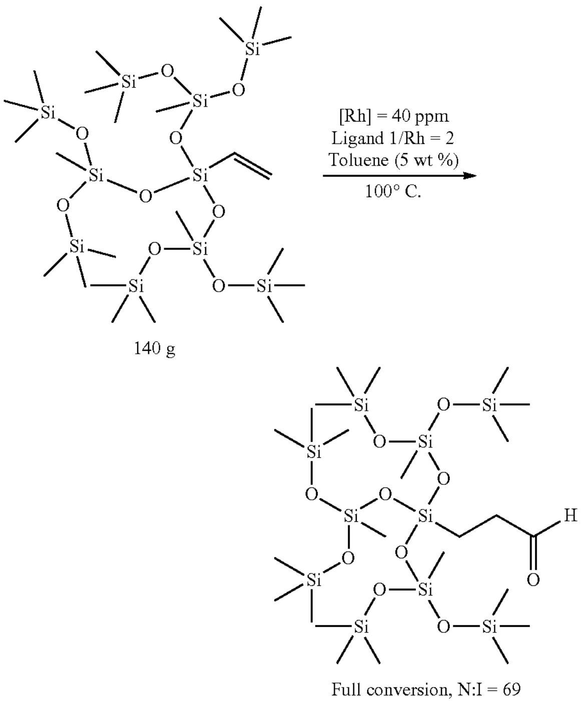

In a nitrogen filled glovebox, $Rh(acac)(CO)_2$ (15.1 mg, 0.0583 mmol), Ligand 1 (76.4 mg, 0.0911 mmol) and toluene (7.49 g, 0.0814 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, 5-((1,1,1,3,5,5,5-heptamethyltrisiloxan-3-yl)oxy)-1,1,1,3,7,9,9,9-octamethyl-3,7-bis((trimethylsilyl)oxy)-5-vinylpentasiloxane (145.0 g, 189.2 mmol) was loaded to a 300-mL Parr-reactor. The reactor was sealed and loaded into the holder. The reactor was pressurized with nitrogen up to 100 psi (689 kPa) via the dip-tube and was carefully relieved through a valve connected to the headspace for three times. The reactor was then pressure tested by pressurizing to 300 psi (2068 kPa) with nitrogen. After the pressure was released, the catalyst solution was added to the reactor via the sample loading port. The reactor was pressurized with syngas to 100 psi (689 kPa) and then released for three times prior to being pressurized to 80 psi (552 kPa) via the dip-tube. Reaction temperature was set to 100° C. Agitation rate was set to 500 RPM. The intermediate cylinder containing syngas and the reactor were connected when the desired temperature was reached. The pressure was set to 100 psi (689 kPa). The reaction progress was monitored by a data logger which measured the pressure in the 300 mL intermediate cylinder as it supplied syngas to the reactor via a pressure reducing regulator. >98% conversion was observed after 200 minutes. N/I ratio was determined by $^1$H NMR analysis of the final product.

In this Example 24, hydroformylation of a branched oligomer was performed as described in Example 23, with the following exceptions: the amount of $Rh(acac)(CO)_2$ was 15.8 mg, 0.0610 mmol, the amount of Ligand 1 was 75.1 mg, 0.0895 mmol, and the amount of toluene was 7.5 g. The amount of Substrate 10 (5-((1,1,1,3,5,5,5-heptamethyltrisiloxan-3-yl)oxy)-1,1,1,3,7,9,9,9-octamethyl-3,7-bis((trimethylsilyl)oxy)-5-vinylpentasiloxane) was 142.4 g, 185.8 mmol. After pressure testing and adding catalyst to the Parr reactor, agitation and heating were initiated. The intermediate cylinder containing syngas and the reactor were connected when the reaction reached 100° C. The pressure of the intermediate cylinder was monitored by a data logger. After the reaction was done, the reactor was purged with nitrogen for three times and the material was transferred to a glass container as a colorless liquid, which turned light yellow over time.

In this Example 25, $MD_{8.7}D^{Pr\text{-}Ald}_{3.7}M$ was synthesized as follows: In a nitrogen filled glovebox, $Rh(acac)(CO)_2$ (0.0191 g), Ligand 1 (0.1324 g) and toluene (76.74 g) were added into a 125 mL bottle with a magnetic stir bar. The mixture was stirred at room temperature on a stir plate until a homogeneous solution was formed. 3.65 g of the solution was transferred to an air-tight syringe with a metal valve and subsequently removed from the glove box. In a ventilated fume hood, $MD_{8.7}D^{vi}_{3.7}M$ (180 g) was loaded to the Parr-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 70° C. Heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of vinyl groups was observed after 24 hours reaction time as monitored by $^1$H NMR.

In this Example 26, $M^{Pr\text{-}Ald}D_7M^{Pr\text{-}Ald}$ was synthesized as follows. Hydroformylation of Substrate 13, Substrate 12, $M^{vi}_2D_7$(DP=7), was performed, as follows: In a nitrogen filled glovebox, $Rh(acac)(CO)_2$ (0.0093 g), Ligand 1 (0.0581 g) and toluene (10 g) were added into a 30 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, $M^{vi}_2D_7$(700 g) was loaded to a 2 liter Autoclave-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 70° C. Heater and agitation were turned on. The cylinder containing the syngas for the reaction and the reactor were connected when the desired temperature was reached. A mass flow totalizer was used to monitor the reaction progress. >98% conversion of vinyl groups was observed after 23 hours reaction time as monitored by $^1$H NMR.

In this Example 26, $M^{Pr\text{-}Ald}D\text{-}M^{Pr\text{-}Ald}$ was synthesized as follows. Hydroformylation of Substrate 12, $M^{vi}_2D_7$ (DP=7), was performed, as follows: In a nitrogen filled glovebox, $Rh(acac)(CO)_2$ (0.0093 g), Ligand 1 (0.0581 g) and toluene (10 g) were added into a 30 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, $M^{vi}_2D_7$ (700 g) was loaded to a 2 liter Autoclave-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 70° C. Heater and agitation were turned on. The cylinder containing the syngas for the reaction and the reactor were connected when the desired temperature was reached. A mass flow totalizer was used to monitor the reaction progress. >98% conversion of vinyl groups was observed after 23 hours reaction time as monitored by $^1$H NMR.

In this Example 27, hydroformylation of Substrate 13 allyl terminated siloxane $M^{a1}D_{102}M^{a1}$, was performed, as follows: In a nitrogen filled glovebox, $Rh(acac)(CO)_2$ (0.0358 g), Ligand 1 (0.257 g) and toluene (50.3 g) were added into a 125 ml bottle with a magnetic stir bar. The mixture was stirred at RT on a stir plate until a homogeneous solution was formed. 0.62 g of the solution was transferred to an air-tight syringe with a metal valve and subsequently removed from the glove box. In a ventilated fume hood, allyl terminated siloxane $M^{a1}1D_{102}M^{a1}$ (38.85 g) was loaded to the Parr-reactor. The reactor was sealed and pressurized with nitrogen up to 100 psig (689 kPa) via the dip-tube and was carefully relieved through a valve connected to the head-space. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 80° C. Heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of vinyl groups was observed after 53 hours reaction time as monitored by $^{1}$H NMR.

In this Example 29, hydroformylation of Substrate 15, $M^{Vi}_2D_{25}$, was performed, as follows: In a nitrogen filled glovebox, $Rh(acac)(CO)_2$ (0.0252 g), Ligand 1 (1.63 g) and toluene (50 g) were added into a 125 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, $M^{Vi}_2D_{25}$ (1000 g) was loaded to a 2 liter Autoclave-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 80° C. Heater and agitation were turned on. The cylinder containing the syngas for the reaction and the reactor were connected when the desired temperature was reached. A mass flow totalizer was used to monitor the reaction progress. Full conversion of vinyl groups was observed after 2 hours reaction time as monitored by $^{1}$H NMR.

In this Example 30, Please put hydroformylation of $M^{Vi}_2D_{77}$ description here. Hydroformylation of Substrate 16, $M^{Vi}_2D_{77}$, was performed, as follows: In a nitrogen filled glovebox, $Rh(acac)(CO)_2$ (0.0050 g), Ligand 1 (0.0227 g) and toluene (30.09 g) were added into a 60 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, $M^{Vi}_2D_{77}$ (140.12 g) and toluene (46.92 g) were loaded to the Parr-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 90° C. Heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of vinyl groups was observed after 10 hours reaction time as monitored by $^{1}$H NMR.

In this Example 31, Substrate 17, $M^{Vi}_2D_{180}$, was hydroformylated to form $M^{Pr\text{-}Ald}D_{180}M^{Pr\text{-}Ald}$, as follows. In a nitrogen filled glovebox, $Rh(acac)(CO)_2$ (0.0050 g), Ligand 1 (0.0326 g) and toluene (5.0 g) were added into a 60 mL vial with a magnetic stir bar. The mixture was stirred at RT on a stir plate until a homogeneous solution was formed. The solution was transferred to an air-tight syringe with a metal valve and subsequently removed from the glove box. In a ventilated fume hood, $M^{Vi}_2D_{180}$(200 g) was loaded to the Parr-reactor. The reactor was sealed and pressurized with nitrogen up to 100 psig (689 kPa) via the dip-tube and was carefully relieved through a valve connected to the head-space. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 70° C. Heater and agitation were turned on. The 300 mL intermediate cylinder containing the syngas for the reaction and the reactor were connected when the desired temperature was reached. Pressure drop from a 300 mL intermediate cylinder was used to monitor the reaction progress and was recorded by a data logger. Full conversion of vinyl groups was observed after 3.5 hours reaction time as monitored by $^{1}$H NMR.

In this Example 32, hydroformylation of Substrate 18, $M^{vi}_2D_{329}$, was performed, as follows: In a nitrogen filled glovebox, $Rh(acac)(CO)_2$ (0.380 g), Ligand 1 (2.45 g) and toluene (90 g) were added into a 125 mL vial with a magnetic stir bar. The mixture was stirred at RT on a stir plate until a homogeneous solution was formed. Then 8.6 g of the solution was transferred to an air-tight syringe with a metal valve and subsequently removed from the glove box. In a ventilated fume hood, $M^{vi}_2D_{329}$ (1394 g) was loaded to a 2 liter Autoclave-reactor. The reactor was sealed and pressurized with nitrogen up to 100 psig (689 kPa) via the dip-tube and was carefully relieved through a valve connected to the headspace. The pressure/vent cycle with nitrogen was repeated three times. Pressure testing was subsequently performed by pressurizing the reactor with nitrogen to up to 300 psig (2086 kPa). After the pressure was released, the catalyst solution was added to the reactor via the sample loading port. The reactor was pressurized with syngas to 100 psig (689 kPa) and then vented for three times prior to being pressurized to 20 psig (138 kPa) below the desired pressure via the dip-tube. Reaction temperature was set to 80° C. Heater and agitation were turned on. The cylinder containing the syngas for the reaction and the reactor were connected when the desired temperature was reached. A mass flow totalizer was used to monitor the reaction progress. Full conversion of vinyl groups was observed after stirring overnight as determined by $^1H$ NMR.

All amounts, ratios, and percentages herein are by weight, unless otherwise indicated. The SUMMARY and ABSTRACT are hereby incorporated by reference. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The abbreviations used herein have the definitions in Table 11.

TABLE 11

Abbreviations

| Abbreviation | Definitions |
|---|---|
| acac | acetyl acetonate |
| ° C. | degrees Celsius |
| D | Difunctional siloxy unit, trimethylsiloxy unit of formula $Me_2SiO_{2/2}$ |
| $D^{al}$ | Difunctional siloxy unit, allyldimethylsiloxy unit of formula $(Allyl)(Me)SiO_{2/2}$ |
| $D^{hex}$ | Difunctional siloxy unit, hexenyldimethylsiloxy unit of formula $(Hex)(Me)SiO_{2/2}$ |
| $D^{vi}$ | Difunctional siloxy unit, vinyldimethylsiloxy unit of formula $(Vi)(Me)SiO_{2/2}$ |
| FTIR | Fourier transform infra-red |
| g | gram |
| GPC | gel permeation chromatography |
| h | hour |
| Hex | hexenyl |
| kPa | kiloPascals |
| M | Monofunctional siloxy unit, trimethylsiloxy unit of formula $Me_3SiO_{1/2}$ |
| $M^{al}$ | Monofunctional siloxy unit, allyldimethylsiloxy unit of formula $(Allyl)(Me_2)SiO_{1/2}$ |
| $M^{hex}$ | Monofunctional siloxy unit, hexenyldimethylsiloxy unit of formula $(Hex)(Me_2)SiO_{1/2}$ |
| $M^{Pr\text{-}ald}$ | Monofunctional siloxy unit, hexenyldimethylsiloxy unit of formula $(Pr\text{-}ald)(Me_2)SiO_{1/2}$ |
| $M^{vi}$ | Monofunctional siloxy unit, vinyldimethylsiloxy unit of formula $(Vi)(Me_2)SiO_{1/2}$ |
| Me | methyl |
| mg | milligram |
| min | minute |
| mL | milliliter |
| mm | millimeter |
| Mmol | millimole |
| Mn | number average molecular weight measured by GPC |
| Mw | weight average molecular weight measured by GPC |
| mPa · s | milliPascal seconds |
| NMR | nuclear magnetic resonance |
| PDI | Polydispersity index (calculated as Mw/Mn) |
| Ph | phenyl |
| Pr-ald | Propyl-aldehyde |
| psi | pounds per square inch |
| Q | Tetrafunctional siloxy unit of formula $SiO_{4/2}$ |
| RPM | revolutions per minute |
| RT | room temperature of 25 ± 5° C. |
| THF | tetrahydrofuran |
| μm | micrometer |
| Vi | vinyl |
| ppm | parts per million by weight |

The following test methods were used herein. FTIR: The concentration of silanol groups present in the polyorganosiloxane resins (e.g., polyorganosilicate resins and/or silsesquioxane resins) was determined using FTIR spectroscopy according to ASTM Standard E-168-16. GPC: The molecular weight distribution of the polyorganosiloxanes was determined by GPC using an Agilent Technologies 1260 Infinity chromatograph and toluene as a solvent. The instrument was equipped with three columns, a PL gel 5 μm 7.5×50 mm guard column and two PLgel 5 μm Mixed-C 7.5×300 mm columns. Calibration was made using polystyrene standards. Samples were made by dissolving polyorganosiloxanes in toluene (~1 mg/mL) and then immediately analyzing the solution by GPC (1 m/min flow, 35° C. column temperature, 25-minute run time). $^{29}Si$ NMR: Alkenyl content of starting material (B) can be measured by the technique described in "The Analytical Chemistry of Silicones" ed. A. Lee Smith, Vol. 112 in Chemical Analysis, John Wiley & Sons, Inc. (1991). Viscosity: Viscosity may be measured at 25° C. at 0.1 to 50 RPM on a Brookfield DV-III cone & plate viscometer with #CP-52 spindle, e.g., for polymers (such as certain (B2) alkenyl-functional polyorganosiloxanes) with viscosity of 120 mPa·s to 250,000 mPa·s. One skilled in the art would recognize that as viscosity increases, rotation rate decreases and would be able to select appropriate spindle and rotation rate.

PROBLEMS TO BE ADDRESSED

The lack of a good catalyst system constitutes a significant challenge for the commercialization of a hydroformylation process for organosilicon compounds. Previously proposed processes suffer from one or more of the following drawbacks: slow reaction rate, low linear selectivity, and high catalyst loading. Slow reaction rate leads to low productivity. The high catalyst loading used would lead to difficulties in catalyst recycling. Low linear selectivity would eventually lead to product decomposition since the branched product tends to undergo Brook rearrangement reaction.

The present hydroformylation process provides one or more benefits over previously proposed processes; i.e., faster reaction rate, improved selectivity, and lower catalyst loadings to achieve these. As shown in the examples above, the hydroformylation process can produce a reaction product, which comprises: a) a first organosilicon compound comprising a linear aldehyde-functional moiety, and b) a second organosilicon compound comprising a branched aldehyde-functional moiety; wherein a molar ratio of the linear aldehyde-functional moiety/the branched aldehyde-functional moiety (N/I ratio)>6. Furthermore, the hydroformylation process is robust and provides these benefits with a wide range of alkenyl-functional organosilicon compound starting materials.

The invention claimed is:

1. A reaction product prepared by a process comprising:

1) combining, under conditions to catalyze hydroformylation reaction, starting materials comprising (A) a gas comprising hydrogen and carbon monoxide, (B) an alkenyl-functional organosilicon compound, and (C) a rhodium/bisphosphite ligand complex catalyst, where the bisphosphite ligand has formula

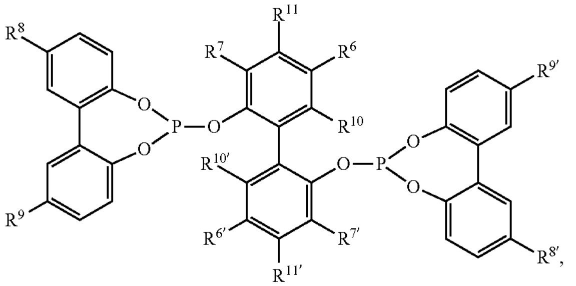

where $R^6$ and $R^{6'}$ are each independently selected from the group consisting of hydrogen, an alkyl group of 1 to 20 carbon atoms, a cyano group, a halogen group, and an alkoxy group of 1 to 20 carbon atoms;

$R^7$ and $R^{7'}$ are each independently selected from the group consisting of an alkyl group of 3 to 20 carbon atoms, and a group of formula —$SiR^{17}_3$, where each $R^{17}$ is an independently selected monovalent hydrocarbon group of 1 to 20 carbon atoms;

$R^8$, $R^{8'}$, $R^9$, and $R^{9'}$ are each independently selected from the group consisting of hydrogen, an alkyl group, a cyano group, a halogen group, and an alkoxy group, and $R^{10}$ $R^{10'}$, $R^{11}$, and $R^{11'}$ are each independently selected from the group consisting of hydrogen or and alkyl group;

wherein the reaction product comprises the aldehyde-functional organosilicon compound, wherein the aldehyde-functional organosilicon compound has, per molecule, at least one aldehyde-functional group covalently bonded to silicon, wherein the aldehyde-functional group has formula

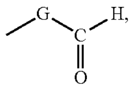

where

G is a divalent hydrocarbon group free of aliphatic unsaturation that has 2 to 8 carbon atoms; and the rhodium/bisphosphite ligand complex catalyst; and wherein the aldehyde-functional organosilicon compound comprises a) a first organosilicon compound comprising a linear aldehyde-functional moiety, and b) a second organosilicon compound comprising a branched aldehyde-functional moiety; wherein a molar ratio of the linear aldehyde-functional moiety/the branched aldehyde-functional moiety (N/I ratio)>6.

2. The reaction product of claim 1, where starting material (B) comprises an alkenyl-functional silane of formula (B1): $R^A_xSiR^4_{(4-x)}$, where each $R^A$ is vinyl; each $R^4$ is independently selected from the group consisting of an alkyl group of 1 to 18 carbon atoms, an aryl group of 6 to 18 carbon atoms, an acyloxy group of 2 to 18 carbon atoms, and an hydrocarbonoxy-functional group of 1 to 18 carbon atoms; and subscript x is 1 to 4.

3. The reaction product of claim 1, where the alkenyl-functional organosilicon compound comprises an alkenyl-functional polyorganosiloxane of unit formula: $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(SiO_{4/2})_g(ZO_{1/2})_h$; where each $R^A$ is vinyl, and each $R^4$ is independently selected from the group consisting of an alkyl group of 1 to 18 carbon atoms, an aryl group of 6 to 18 carbon atoms, and an hydrocarbonoxy group of 1 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in formula (B2-1) and have values such that subscript a≥0, subscript b≥0, subscript c≥0, subscript d≥0, subscript e≥0, subscript f≥0, subscript g≥0; and subscript h has a value such that 0≤h/(e+f+g)≤1.5, 10,000≥(a+b+c+d+e+f+g)≥2, and a quantity (b+d+f)≥1.

4. The reaction product of claim 3, where the alkenyl-functional polyorganosiloxane is cyclic and has a unit formula selected from the group consisting of: $(R^4R^ASiO_{2/2})_d$, where subscript d is 3 to 12; $(R^4_2SiO_{22})_c(R^4R^ASiO_{2/2})_d$, where c is >0 to 6 and d is 3 to 12; and a combination thereof.

5. The reaction product of claim 3, where the alkenyl-functional polyorganosiloxane is linear and comprises unit formula (B3): $(R^4_3SiO_{1/2})_a(R^4_2R^ASiO_{1/2})_b(R^4_2SiO_{2/2})_c(R^4R^ASiO_{2/2})_d$, where a quantity (a+b)=2, a quantity (b+d)≥1, and a quantity (a+b+c+d)≥2.

6. The reaction product of claim 3, where the alkenyl-functional polyorganosiloxane is an alkenyl-functional polyorganosilicate resin comprising unit formula: $(R^4_3SiO_{1/2})_{mm}(R^4_2R^ASiO_{1/2})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo>0, and 0.5≤(mm+nn)/oo≤4.

7. The reaction product of claim 3, where the alkenyl-functional polyorganosiloxane is an alkenyl-functional silsesquioxane resin comprising unit formula: $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(ZO_{1/2})_h$; where f>1, 2<(e+f)<10,000; 0<(a+b)/(e+f)<3; 0<(c+d)/(e+f)<3; and 0<h/(e+f)<1.5.

8. The reaction product of claim 3, where each $R^4$ is independently selected from the group consisting of methyl and phenyl.

9. The reaction product of claim 1, where in the bisphosphite ligand, $R^6$ and $R^{6'}$ are each selected from the group consisting of a methoxy group and a t-butyl group, $R^7$ and $R^{7'}$ are each a t-butyl group, and $R^8$, $R^{8'}$, $R^9$, $R^{9'}$, $R^{10}$, $R^{10'}$, $R^{11}$, and $R^{11'}$ are each hydrogen.

10. The reaction product of claim 1, where starting material (C) is present in an amount sufficient to provide 0.1 ppm to 300 ppm Rh based on weight of (B) the alkenyl-functional organosilicon compound.

11. The reaction product of claim 1, where starting material (C) has a molar ratio of bisphosphite ligand/Rh of 1/1 to 10/1.

12. The reaction product of claim 1, where the conditions in step 1) are selected from the group consisting of:

i) a temperature of 30° C. to 150° C.;

ii) a pressure of 101 kPa to 6,895 kPa;

iii) a molar ratio of $CO/H_2$ in the syngas of 3/1 to 1/3; and iv) a combination of two or more of conditions i), ii) and iii).

13. The reaction product of claim 1, where (C) the rhodium/bisphosphite ligand complex catalyst is formed by combining a rhodium precursor and the bisphosphite ligand to form a rhodium/bisphosphite ligand complex and combining the rhodium/bisphosphite ligand complex and starting material (A) with heating before step 1).

14. The reaction product of claim 10, where starting material (C) is present in an amount sufficient to provide 0.25 ppm to 20 ppm Rh.

15. The reaction product of claim 3, wherein the alkenyl-functional polyorganosiloxane is branched.

16. The reaction product of claim 3, wherein the alkenyl-functional polyorganosiloxane comprises formula: $[R^{A}R^4_2Si—(O—SiR^4_2)_x—O]_{(4-w)}—Si—[O—(R^4_2SiO)_v SiR^4_3]_w$, where $R^{A}$ and $R^4$ are as described above; and subscripts v, w, and x have values such that 200≥v≥1, 2≥w≥0, and 200≥x≥1.

17. The reaction product of claim 3, wherein the alkenyl-functional polyorganosiloxane comprises unit formula: $(R^4_3SiO_{1/2})_{aa}(R^{A}R^4_2SiO_{1/2})_{bb}(R^4_2SiO_{2/2})_{cc}(R^{A}R^4SiO_{22})_{ee}(R^4SiO_{3/2})_{dd}$, where $R^4$ and $R^{A}$ are as described above, subscript aa≥0, subscript bb>0, subscript cc is 15 to 995, subscript dd>0, and subscript ee≥0.

18. A process for preparing an aldehyde-functional organosilicon compound, said process comprising:

1) combining, under conditions to catalyze hydroformylation reaction, starting materials comprising (A) a gas comprising hydrogen and carbon monoxide, (B) an alkenyl-functional organosilicon compound, where the alkenyl-functional organosilicon compound comprises an alkenyl-functional silazane, and (C) a rhodium/bisphosphite ligand complex catalyst, where the bisphosphite ligand has formula

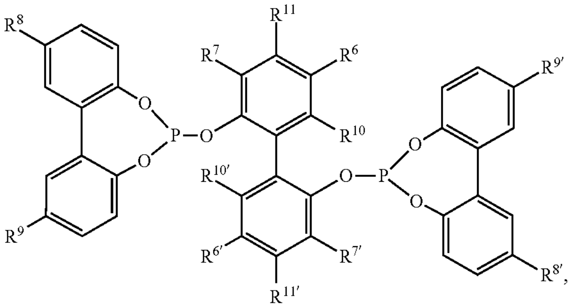

where $R^6$ and $R^{6'}$ are each independently selected from the group consisting of hydrogen, an alkyl group of 1 to 20 carbon atoms, a cyano group, a halogen group, and an alkoxy group of 1 to 20 carbon atoms;

$R^7$ and $R^{7'}$ are each independently selected from the group consisting of an alkyl group of 3 to 20 carbon atoms, and a group of formula $—SiR^{17}_3$, where each $R^{17}$ is an independently selected monovalent hydrocarbon group of 1 to 20 carbon atoms;

$R^8$, $R^{8'}$, $R^9$, and $R^{9'}$ are each independently selected from the group consisting of hydrogen, an alkyl group, a cyano group, a halogen group, and an alkoxy group, and $R^{10}$ $R^{10'}$, $R^{11}$, and $R^{11'}$ are each independently selected from the group consisting of hydrogen or and alkyl group.

* * * * *